United States Patent
Iannotti et al.

(10) Patent No.: US 6,356,823 B1
(45) Date of Patent: Mar. 12, 2002

(54) SYSTEM FOR MONITORING AND RECORDING MOTOR VEHICLE OPERATING PARAMETERS AND OTHER DATA

(75) Inventors: Joseph A. Iannotti, Whitesboro; Richard J. Gawrelski, Amsterdam; David Russell, Rome, all of NY (US)

(73) Assignee: ITT Research Institute, Chicago, IL (US)

( * ) Notice: Subject to any disclaimer, the term of this patent is extended or adjusted under 35 U.S.C. 154(b) by 0 days.

(21) Appl. No.: 09/492,687

(22) Filed: Jan. 27, 2000

Related U.S. Application Data
(60) Provisional application No. 60/162,650, filed on Nov. 1, 1999.

(51) Int. Cl.[7] .............................................. G06F 13/00
(52) U.S. Cl. .......................................... 701/35; 369/21
(58) Field of Search ............................... 701/35; 369/21

(56) References Cited

U.S. PATENT DOCUMENTS

| | | | | |
|---|---|---|---|---|
| 5,375,247 A | * | 12/1994 | Hueser | 713/330 |
| 5,499,182 A | * | 3/1996 | Ousborne | 701/35 |
| 5,588,123 A | * | 12/1996 | Loibl | 710/107 |
| 5,638,273 A | * | 6/1997 | Coiner et al. | 701/35 |
| 5,884,202 A | * | 3/1999 | Arjomand | 701/29 |
| 6,073,063 A | * | 6/2000 | Leong Ong et al. | 701/35 |
| 6,151,541 A | * | 11/2000 | Iizuka | 701/51 |

OTHER PUBLICATIONS

Print–out from "dgtech.com" website, 2 pages, date Jan. 20, 2000.
Print–out from "dgtech.com/news.html#gryphon", 3 pages, dated Jan. 20, 2000.
Print–out from "dgtech.com/products/in–vehcile.html" website, 4 pages, dated Jan. 20, 2000.
Print–out from "easesim.com/obdii_veh_requirements.htm", 1 page, dated Jan. 20, 2000.
Print–out from "michsci.com/", 2 pages, dated Jan. 20, 2000.
Print–out from "michsci.com/Data%20Acquisition/prodas/ Michigan% 20Scientific%20ProDAS% 20Data%20Acquisition.htm", 1 page, dated Jan. 20, 2000.
Print–out from "michsci.com/data.htm" 2 pages, dated Jan. 20, 2000.
Print–out from "michsci.com/Data%20Acquisition/acs–2.0/ Michigan%20Scientific%20ACS% 202.0%20Data%20Acquisition.htm", 1 page, dated Jan. 20, 2000.
Print–out from "autotap.com/autotap.html", 4 pages, dated Jan. 20, 2000.
Print–out from "campbellsci.com/", 1 page, dated Jan. 20, 2000.
Print–out from "campbellsci.com/loggers/html", 3 pages, dated Jan. 20, 2000.
Print–out from "campbellsci.com/outline.html", 1 page, dated Jan. 20, 2000.

(List continued on next page.)

Primary Examiner—William A. Cuchlinski, Jr.
Assistant Examiner—Eric M Gibson
(74) Attorney, Agent, or Firm—Fitch, Even, Tabin & Flannery

(57) ABSTRACT

A motor vehicle data collection, monitoring and management system is provided for ready connection to the vehicle's onboard data network through the data interface provided by the vehicle manufacturer. The data collected includes data available on the manufacturer's network, such as network data traffic between control modules, as well as data from discrete components located outside of the motor vehicle network. The data collecting and monitoring system exhibits power saving features including automatic shutdown when the motor vehicle is switched off. A methodology for configuring the system is also disclosed.

18 Claims, 20 Drawing Sheets

OTHER PUBLICATIONS

Print–out from "bb–elec.com/", 2 pages, dated Jan. 20, 2000.

Print–out from "obdii.com/background.html", 3 pages, dated Jan. 20, 2000.

Print–out from "obdii.com/connector.html#dates", 3 pages, dated Jan. 20, 2000.

Print–out from "obdii.com/connector.html#which%20cars", 3 pages, dated Jan. 20, 2000.

Print–out from "northstarlabs.com/rp6.htm", 3 pages, dated Jan. 20, 2000.

Print–out from "xeon.com/design/intarch/papers/j1850_wp.htm", 1 page, dated Jan. 20, 2000.

Print–out from "intel.se/design/mcs96/papers/autolx-bk.htm", 3 pages, dated Jan. 20, 2000.

Article entitled "OBD–II Background", 17 pages, dated Jan. 20, 2000.

* cited by examiner

| Fig. 10a | Fig. 10b |

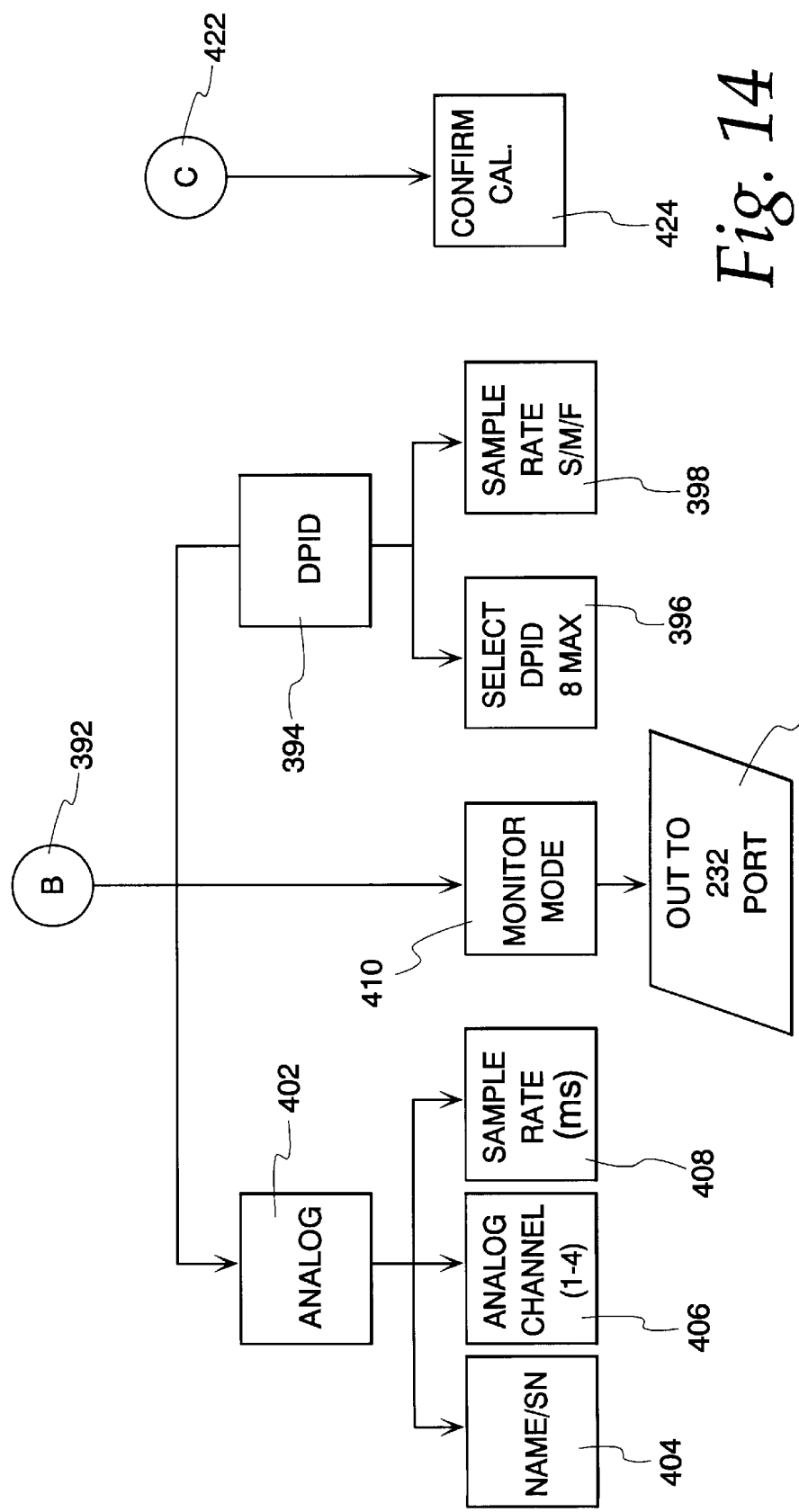

SYSTEM FOR MONITORING AND RECORDING MOTOR VEHICLE OPERATING PARAMETERS AND OTHER DATA

This application claims benefit of Provisional No. 60/162,650, filed Nov. 1, 1999.

BACKGROUND OF THE INVENTION

1. Field of the Invention

The invention relates, in general, to systems for monitoring and logging and managing operating parameters of land based vehicles. More specifically, the invention relates to motor vehicles having onboard networks for the management and control of the motor vehicle.

2. Description of the Related Art

By design of their manufacturers, motor vehicles increasingly require real time data as part of their normal operation. Such data exists in varying levels of detail, and it is now possible to provide data analysts with substantial amounts of operating data. Typically, data analysts may be interested in providing recommendations to fleet operators, public service utilities, common carriers, business travelers, and personnel engaged in outside sales activities, as well as private owner/operators. Such data is being put to new uses. For example, in addition to preventive maintenance, such data is used by individuals charged with corporate responsibility for driver's supervision, route and trip planning, for scheduling of customer services and for roadway tax reporting. In addition, from the motor vehicle manufacturer's standpoint, analysis of collected data can help manufacturers refine vehicle designs to meet specific customer needs.

In the past, data recording systems have been provided to log certain limited operating variables incident to ground-based vehicle operation. One example is the accumulation of data from which gasoline mileage can be analyzed. The logging of more complex operating events requires a substantial increase in logging capabilities, oftentimes to the point where several logging devices are required to be operated in conjunction with one another.

More sophisticated general purpose data logging equipment is commercially available. However, in order to adequately address a relatively complex system such as that of a ground-based vehicle, a number of special purpose separate components would have to be obtained from different vendors. The resulting arrangement is unwieldy for regular commercial use of a motor vehicle. Further, the various added components must be carefully matched to each other and to vehicle systems designed by the motor vehicle manufacturer. It is important that the monitoring devices are not allowed to interfere with motor vehicle operation and that the data collected accurately reflects vehicle operating conditions, free of inadvertent aberrations caused by the data collecting system.

SUMMARY OF THE INVENTION

Motor vehicle manufacturers have been required to provide relatively sophisticated data networks interconnecting the various motor vehicle components and have designed these components to operate in response to data signals and commands. It is an object of the present invention to provide a data monitoring, collecting and managing system for use with a these types of vehicle.

Another object of the present invention is to provide a data monitoring and collecting system of the type mentioned above which is suitable for real time data collection from a data network of an automotive vehicle.

A further object of the present invention is to provide data collecting, monitoring and managing systems of the type described above which are implemented in a single compact package hardened against vibration and shocks and which is easily mountable in a motor vehicle.

A further object according to principles of the present invention is to provide a data collection and monitoring system in which components within the device package are related to discrete circuitry modules devoted to individual data collecting, monitoring and managing functions, so as to be readily exchanged for different motor vehicle applications.

Yet another object of the present invention is to provide a motor vehicle data collection and monitoring device powered by the motor vehicle electrical system, and having a reduced power consumption so as to avoid presenting a substantial electrical power load to the motor vehicle. A related object of the present invention is to provide the data collection and monitoring device with an automated power down operating feature, triggered in response to shutting off the engine of the motor vehicle.

These and other objects of the present invention are provided in a system for managing vehicle parameter data, for use with a vehicle having a plurality of sensor devices positioned on the vehicle for sensing operating parameters of the vehicle and for generating vehicle parameter data in response thereto, the vehicle further having an onboard vehicle data network for receiving vehicle parameter data from the plurality of sensor devices, the system comprising:

a device for mounting on-board the vehicle;

the device including a passive network connector for interconnecting a plurality of device network modules to the device to form a device network;

the device further including a plurality of device network modules connected to the passive network connector for data communication with one another;

the plurality of device network modules including a vehicle interface module with a connector for connection to the vehicle data network to receive vehicle parameter data therefrom;

the plurality of device network modules including a control module having a central processing unit with program memory storage for storing an operating program for the central processing unit;

the central processing unit and the vehicle interface module cooperating in accordance with the operating program to receive vehicle parameter data from the vehicle and to make the vehicle parameter data available to the device network.

Other objects of the present invention are provided in a system for managing vehicle parameter data, for use with a vehicle a having a vehicle electrical power circuit operable between ON and OFF conditions to initiate and to cease operation of portions of the vehicle, respectively, the vehicle further having at least one sensor device positioned on the vehicle for sensing an operating parameter of the vehicle and for generating vehicle parameter data in response thereto, the vehicle further having an onboard vehicle data network for receiving vehicle parameter data from the at least one sensor device, the system comprising:

a device for mounting on-board the vehicle;

the device including a network connector for interconnecting a plurality of device network modules to the device to form a device network;

the device further including a plurality of device network modules connected to the passive network connector for data communication with one another, the plurality of device network modules receiving electrical power from a device network electrical power source;

the plurality of device network modules including a sensor interface module with a connector for connection to the at least one sensor device to receive vehicle parameter data therefrom;

the plurality of device network modules includes a power monitor module coupled to the vehicle electrical power circuit to sense the ON and OFF conditions thereof and to interrupt power flow from the network electrical power source to the device network modules in response to sensing an OFF condition of the vehicle electrical power circuit.

Further objects of the present invention are provided in a system for managing vehicle parameter data, for use with a vehicle having at least one sensor device positioned on the vehicle for sensing an operating parameter of the vehicle and for generating vehicle parameter data in response thereto, the system comprising:

a first and a second device for mounting on-board the vehicle, each device including a network connector for interconnecting a plurality of device network modules to the device to form a device network, a plurality of device network modules connected to the network connector for data communication with one another, the plurality of device network modules including a control module having a central processing unit with a system clock and program memory storage for storing an operating program for the central processing unit;

at least one of the devices having a sensor interface module with a connector for connection to the at least one sensor device to receive vehicle parameter data therefrom, the system clock of at least one of the devices being synchronizable to an external clock, and a synchronization communication link between the system clocks for synchronizing the system clocks of one device to the system clock of the other device.

Still further objects of the present invention are provided in a method for generating a data configuration structure used to configure a system for monitoring and recording analog parameter data generated by a vehicle-mounted transducer having a voltage-time slope and network parameter data generated on a vehicle network, comprising the steps of:

entering in the data configuration structure, for each analog parameter:

a name of the parameter;

voltage values defining the voltage-time slope of the transducer;

engineering units to be assigned to the analog parameter data;

a storage threshold data value which must be exceeded before a change in parameter data is recognized;

entering in the data configuration structure, for each network parameter:

a name of the parameter;

the vehicle network address of the parameter;

scale and offset values for the parameter;

engineering units to be assigned to the vehicle network parameter;

entering in the data configuration structure, for each analog parameter, a storage threshold data value which must be exceeded before a change in parameter data is recognized;

entering in the data configuration structure, for each analog parameter and for each network parameter entered, a data representation format for parameter data;

the data representation format including one of the histogram format and the compressed time history format;

entering in the data configuration structure, for each histogram format specified, a bin range expressed in the engineering units assigned for the parameter receiving the data representation format; and entering in the data configuration structure for each compressed time history format specified, a bin range, expressed in the engineering units assigned for the parameter receiving the data representation format; and a hysteresis value, expressed in the engineering units assigned for the parameter receiving the data representation format.

BRIEF DESCRIPTION OF THE DRAWINGS

FIGS. 11–17 together comprise a schematic block diagram of a method for initializing and configuring a monitoring and recording device;

DETAILED DESCRIPTION OF THE PREFERRED EMBODIMENTS

Figure 1:
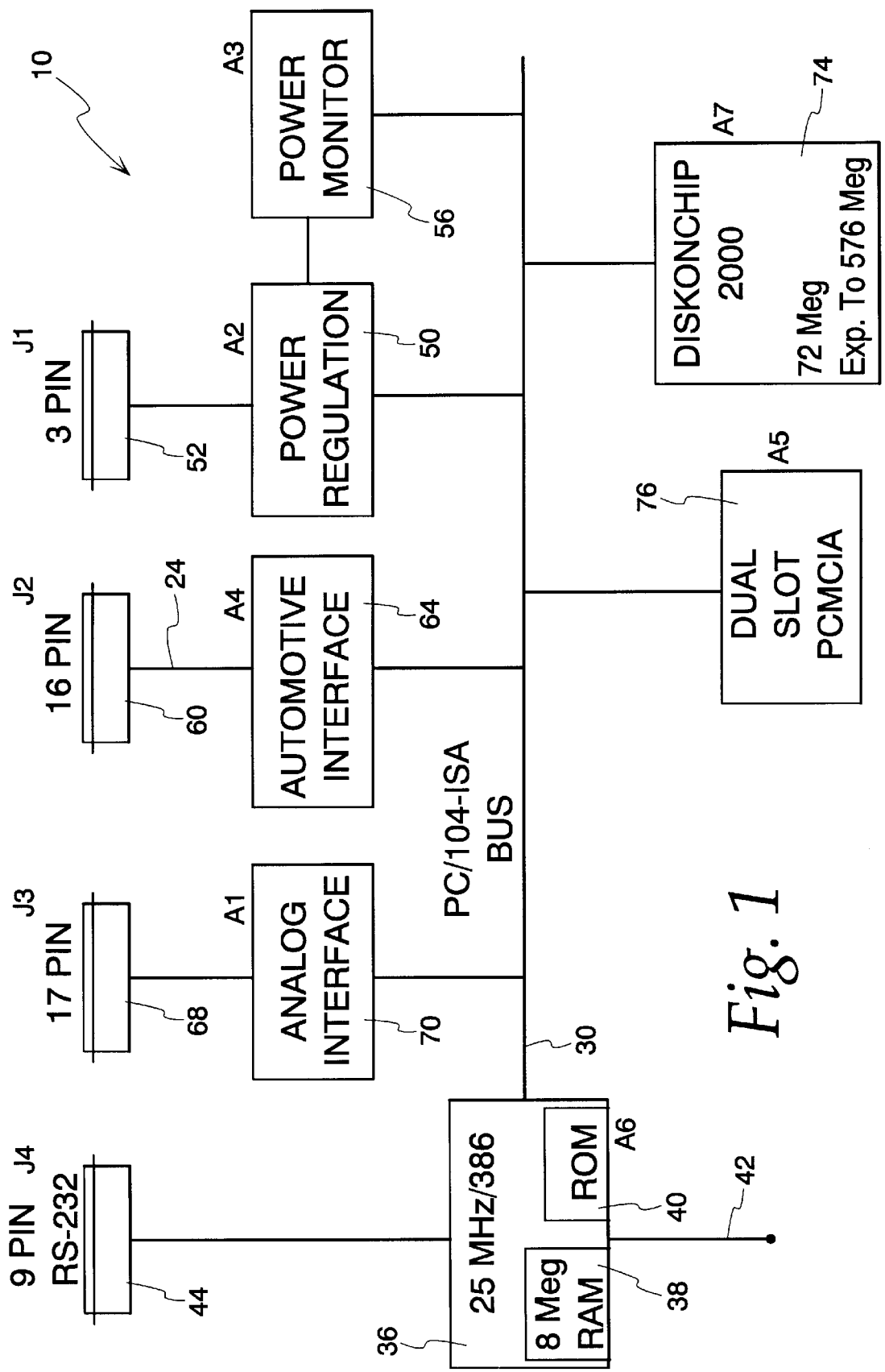
FIG. 1 is a schematic block diagram of a monitoring and recording system according to principles of the present invention.

Referring now to the drawings, and initially to FIG. 1, a schematic diagram of a monitoring and recording device 10 is shown. As will be seen herein, device 10 can be employed in a wide variety of applications, but has found immediate acceptance in the monitoring, recording and management of data taken from land based vehicle systems, and more particularly, automotive systems.

Although the device of the present invention can be employed to monitor and record discrete components and sub-systems, the device is particularly useful for systems having a network over which vehicle data (to be monitored, recorded and otherwise managed) is made to travel. Such systems are typically referred to as having "in-vehicle networking" or "multiplexing" capability. These terms refer to a method for transferring data among distributed electronic modules via a data bus, usually arranged in serial format. These systems avoid the need for bulky wiring harnesses for connecting the electronic modules in point-to-point fashion.

Those skilled in the art are aware of industry standards which have been created for these types of systems. Emissions legislation termed OBD-II has been established by the California Air Resources Board. This legislation requires the standardization of On Board Diagnostic tools for emission-related systems. Initially, the OBD-II standard was experienced by vehicle owners as stored fault codes made available through a diagnostic port (typically a cable connector).

In a related effort, the Society For Automotive Engineers developed standard J1850 and other standards for in-vehicle networks. The SAE J1850 standard has Variable Pulse Width and Pulse Width Modulation versions. The Society For Automotive Engineers has also specified three basic categories of in-vehicle networks based on network speed and functions. The three classes are designated AAN, BAN and CAN, with CAN (i.e., the class C automotive network) having the highest network speed and greatest range of functions, including real-time control of system components. Class B, for example, employs a medium speed network and with data functions being limited to general information transfer. The class A network has the slowest network speed and has data functions relating only to convenience features. The present invention is described with reference to a class B automotive network, adopting the SAE J1850 standard. As will be seen herein, the present invention can also be readily employed with a more demanding Eschelon standard or with class C automotive network implemented by the CAN 2.0 protocol, for example. As will be appreciated by those skilled in the art, the present invention can also be employed with other protocols such as international protocol ISO 9141 and other SAE protocols for cars, trucks and other motor vehicles. The present invention may also be employed with other non-automotive land-based vehicles as well.

As mentioned, the present invention is described with reference to the SAE J1850 protocol. In this protocol, prioritized messages are transferred over a serial bus. Arbitration capability is employed when multiple nodes attempt to transmit a message over the network at the same time. This is implemented by assigning different priorities to different "nodes" or "modules" within the automotive network. With brief reference to FIG. 18, an automotive network 14 has a serial bus 16 and a plurality of nodes or modules 18. The automotive network referred to in the preferred embodiment typically has a wide variety of sensors, transducers and actuators located throughout the vehicle, and multiples of these different devices can be serviced by a single node or module. A monitoring and recoding device 10 according to principles of the present invention is coupled to the automotive network by an inter-connecting cable 24.

Figure 18:
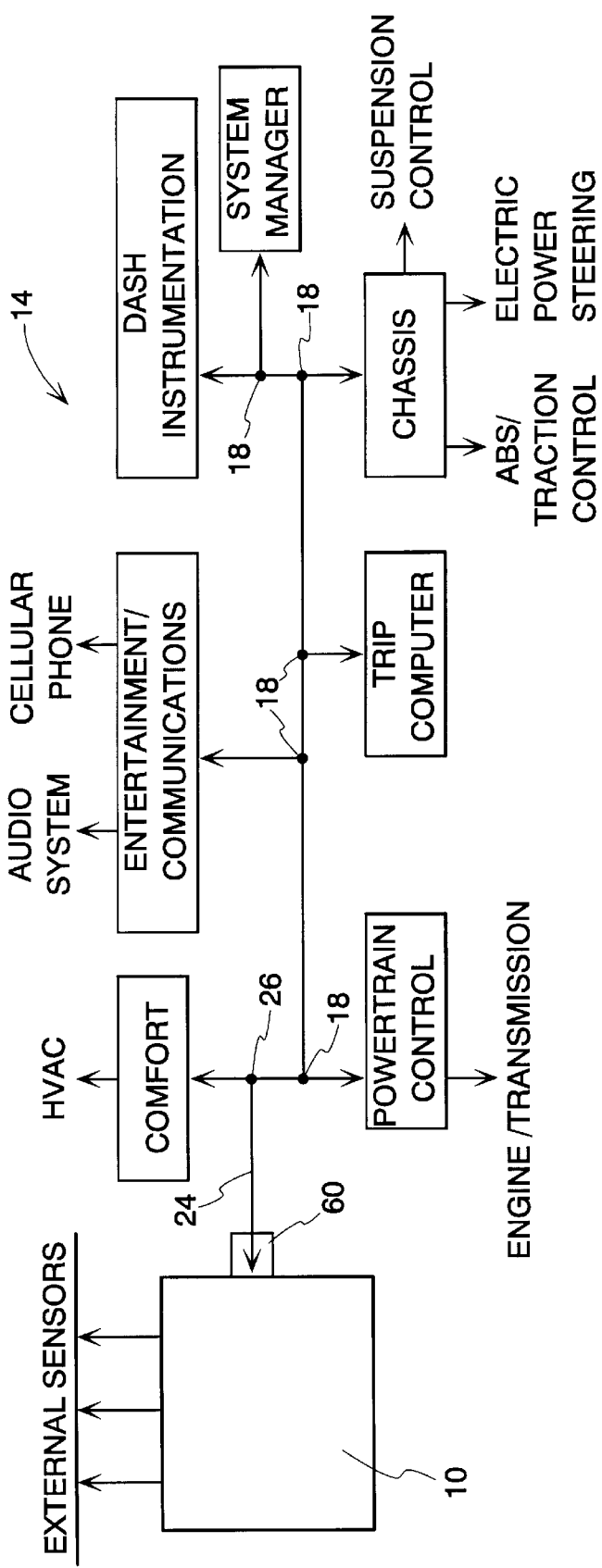
FIG. 18 is a schematic diagram of the monitoring and recording device coupled to an automotive network.

As illustrated in FIG. 18, cable 24 is terminated on bus 16 at a node or module 26, thus forming part of the automotive network. Preferably, node or module 26 is provided by the vehicle manufacturer in the form of a diagnostic port, physically embodied as a cable connector for hook-up to an external device, herein the monitoring and recording device 20. As will be seen herein, the monitoring and recording device 10 includes onboard microcomputer control for collecting and optionally disassembling network data according to a user's pre-programmed preferences. Also included is a communications port for communication with an external computer employed by the user to extract desired data from the monitoring and recording device.

As mentioned, the monitoring and recording device of the present invention can be employed to manage data which does not travel on the onboard automotive network. This extra-network data (whether analog or less popularly digital) will be referred to herein as "analog data" monitored on analog channels. One example of such data comes from an opto-isolated frequency counter used to monitor the revolutions of a wheel or system component coupled to a wheel, in order to derive vehicle travel distance from point to point.

The monitoring and recording device of the present invention has onboard microcomputer capability. The device's computer module controls other modules in the device using programmable operating system software. According to principles of the present invention, the software is multi-tasking and operates in real time (thus referred to as a real-time operation system-RTOS). By employing a real time operating system, both software and hardware interrupts are made available to the system programmer. Additional aspects of the operating system include the ability to offer a quick boot-up time, needed to prevent loss of data when the vehicle is started and immediately placed in use. Also, the operating system preferably makes efficient use of random access memory and offer synchronization for other monitoring and recording devices. In the preferred embodiment, QNX is chosen as the operating system so as to provide the above-listed advantages. By employing QNX as the real time operating system, multi-tasking and expandability of device 10 can be readily implemented. Further, since the QNX operating system is a true real-time operating system with both software and hardware interrupts, it exhibits a fault tolerance and a flexible accommodation for device 10, when employed as an embedded system. In addition to the hardware and operating system components referred to above, the monitoring and recording system of he present invention also includes a user interface, preferably in graphical form, which will be described in greater detail with reference to FIGS. 11–17.

The hardware component of the monitoring and recording device 10 is schematically indicated in FIG. 1 and employs a "bus" or network connector structure 30, preferably passive, which utilizes a PC/104 board outline and an ISA interconnection scheme. Bus 30 is preferably of the stack-through type and most preferably is of a conventional ISA type. FIG. 1 shows a plurality of device network modules, each of which are preferably embodied on discrete PC/104 cards. This allows the monitoring and recording device to easily be reconfigured, for example, to interface to a different communication network, to increase processing power, to change the number of external sampling channels (i.e., external to the automotive network) and to change input voltage requirements. A control module 36 resides on a separate PC/104 card and includes onboard random access (RAM) memory 38 and software embedded in read-only (ROM) memory 40. The control module 36, as mentioned, employs an onboard microcomputer chip. Preferably, the microcomputer chip is of the x86 family with the 386 chip providing lower power consumption with a resulting trade-off of reduced computer capability. If desired, higher powered 486 and 586 microcomputer chips could be substituted with the simple substitution of a PC/104 card. The control module, as mentioned, is preferably located on a single PC/104 card. The card includes a 386 computer chip running at 25 MHZ and performs all the necessary functions of device 10. The computer chip communicates, via the ISA bus, to the remaining PC/104 cards, i.e., the remaining modules of device 10, and is responsible for device sampling, storage and system management. The control module includes the BIOS/Boots EPROM, NVRAM, lithium battery for NVRAM back-up, eight megabytes of RAM, a real-time clock, three programmable counters, and a 115 Kbps RS-232 port that will be used to interface to the host computer. The host computer will use this port for monitoring the device 10 while in the monitor mode, for data upload, and configuration file download at the time required. As indicated in FIG. 1, a user can communicate via a telephone network with the device 10 through a serial communication (RS-232) port 44 (or optionally a wireless interface or network interface, not shown), so as to operate the (QNX RTOS) device 10 remotely, with full functionality. By employing a passive PC/104 board outline and interconnection scheme, device 10 allows very flexible hardware configuration in a modular design. As will be seen herein, device 10 can be packaged in a low profile form (see FIG. 3) or in a high profile form (see FIG. 4).

Referring again to FIG. 1, device 10 includes a power supply or power regulation module 50 which is coupled through bus 30, to the automotive vehicle power source via connecter 52, and to a power monitor module 56. Connector 52 and related components provide an electrical power source for the device network. Preferably, the power regulation module 50 and power monitor module 56 are embodied on separate PC/104 cards. Power regulation module 50 provides conventional supply of power to device 10, whereas power monitor module 56 includes power management functions, including an instantaneous or time-delayed automatic shut-down in response to a vehicle shut-down. The power monitor board contains a power monitor and control circuitry used to shut down device 10 in a sequential mode due to end of sampling or removal of switched DC power from the vehicle. The device 10 monitors switched DC voltage from the vehicle battery to determine when to power-up, typically initiated by the ignition switch. The device 10 operates as long as the switched voltage on the vehicle is present. Upon loss of switched voltage, device 10 will begin its shutdown sequence and the shutdown, subject to a time delay, during which device 10 continues to sample after the vehicle is turned off. If the power is removed from device 10 the circuit will power-down in a logical sequence immediately. This power-down sequence allows for reliable data storage in the event of raw power loss.

Also included with computer module 36 is an output coupled to an interconnect 42 for sending a synchronization pulse to a second monitoring and recording device. This synchronization capability allows the ready addition of external data channels. This is useful, for example, to perform a special intricate test on the motor vehicle. It is desirable in many instances to be able to relate data from the automotive network for a first group of external data channels, to data taken from other external channels, on a common time basis in order to reconstruct the sequence of events occurring within the automotive vehicle.

Figure 19:
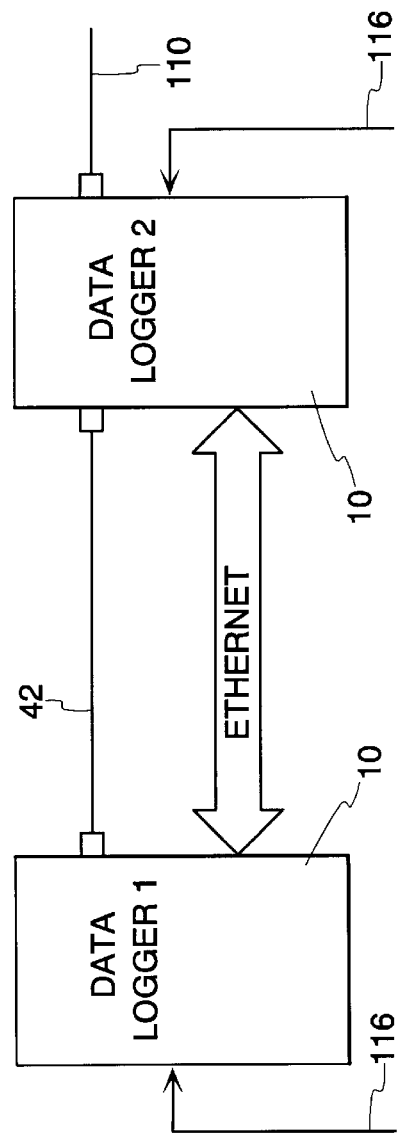
FIG. 19 is a schematic diagram showing a multiple monitoring and recording devices coupled together.

Referring to FIG. 19, the monitoring and recording devices 10 each include an optional Ethernet module embodied on a separate PC/104 card. The Ethernet connection allows the devices 10 to be networked together and, optionally, to other, external Ethernet networks. The synchronization pulse referred to above, is indicated by reference numeral 42 and is preferably implemented as a bi-directional sync/store pulse, on a hardwired interrupt line indicated by reference numeral 42. This hardwired interrupt line is used to synchronize the devices 10 with respect to time. Preferably, the system clock of one device 10 is reset to a fixed value when the system clock of the second device 10 equals that value. the hardwired interrupt line also signals the second device 10 when a sample needs to be stored or when a trigger event has occurred. In this sense, the two monitoring and recording devices 10 operate in a master/slave relationship. By employing the preferred interconnection scheme, the two monitoring and recording deices 10 can be made to operate as one unit.

Certain variations may be of particular advantage when multiple monitoring and recording devices are synchronized together. As mentioned, the synchronizing signals are preferably communicated through a hardwired connection. However, it is also possible to communicate the synchronization through other types of links, such as a fiber optic link, as well as wireless radio and infrared links.

As was mentioned with reference to FIG. 18, the automotive interface module of the monitoring and recording device 10 is directly connected to the automotive network 14 by an interconnect cable 24. Connector 60, preferably of the J1962 type, is also shown in FIG. 1 and provides the hardware connection to the automotive interface module. Data to be requested from the automotive network is identified by signals transmitted through automotive interface module 64, and is placed on the automotive network. The requested data is then downloaded from the automotive network through cable 24 and automotive interface 64, to bus 30.

As mentioned, it is desirable at times to collect data from components and systems which are carried by the automotive vehicle, but which are not linked to the onboard automotive network. Conventional wiring and other connections are provided to the desired sensors, transducers, actuators or other components through connector 68 to analog interface module 70, which then transmits the external or extra-network data to bus 30. Data present on device bus 30 can be stored in solid state memory module 74 or can be transferred to a conventional PCMCIA module 76.

The analog interface module 70 allows for sampling of parameters not available through the automotive network. This module has four different analog input channels and an opto-isolated sixteen-bit counter built on a PC/104 form factor card, which provides low pass filtering, amplification and sampling. A twelve-bit analog to digital converter and multiplexer are used to monitor each analog input. The sampled inputs are stored in a temporary register and read out by the single board control module 36 when required.

The analog interface module also provides the opto-isolation and counter circuitry required for pulse counters, such as those which indicate vehicle position and length of travel. Each pulse increments the sixteen-bit counter and, when required by compressed time history (CTH) data acquisition, for example, the control module 36 reads and resets the appropriate counter. The counter is capable of counting at a rate of up to 5 KHz.

The analog input channels are capable of sampling a plus or minus 5 volt differential analog input at a 500 Hz rate. Through the user interface to be discussed herein, the operator can define low and high voltage input range and the corresponding parameter value represented by each voltage. This analog interface module also contains a buffering circuit and level conversion required for the Date Collect Enable input which provides an interrupt signal to the control module (see reference numeral 246 in FIG. 10).

The arrangement illustrated in FIG. 1 includes optional modules which can be omitted, if desired, in certain instances. For example, if only network data is required, analog interface module 70 can be omitted. Conversely, if onboard automotive network data is not required, automotive interface module 64 can be omitted. Further, one or both of the memory storage modules 74, 76 can be omitted, or can be replaced by a conventional telephone network module communicating through a cellular telephone connection to a remote data monitoring/storing system.

As will now be seen, in this regard, that the ISA bus of device 10 allows for ready exchange of modules and, as mentioned, it is preferred that each module of device 10 be located on a separate PC/104 card. Additional advantages are obtained since each of the PC/104 cards are independently I/O addressable allowing ready implementation of software code features embedded in the control module 36. With additional reference to FIG. 2, it can be seen that the ISA bus 30 includes two components, a 64 pin bus 30*a* and a 40 pin bus 30*b*.

Figure 2:
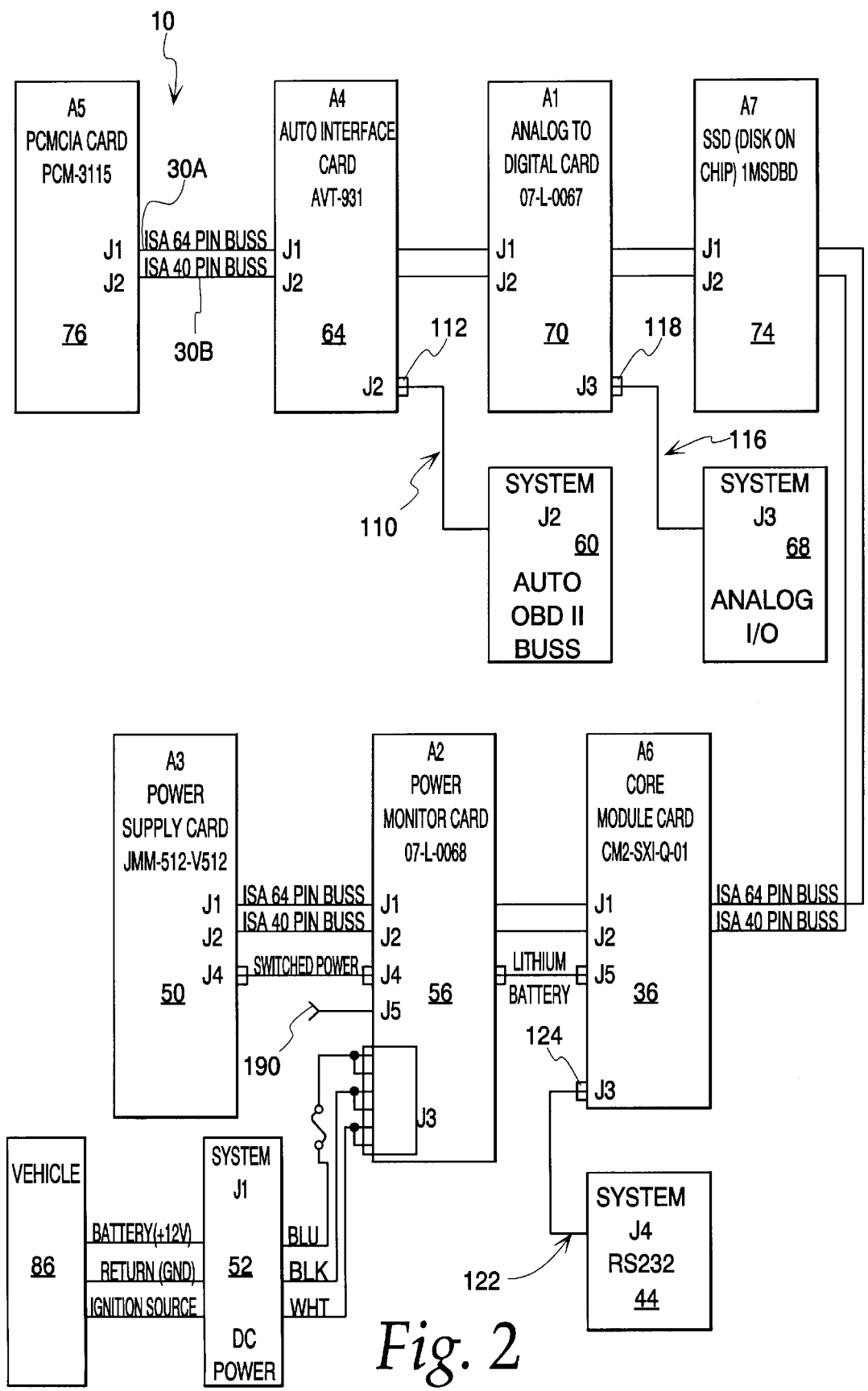
FIG. 2 is a schematic diagram similar to that of FIG. 1, but shown in greater detail.
Figure 3A:
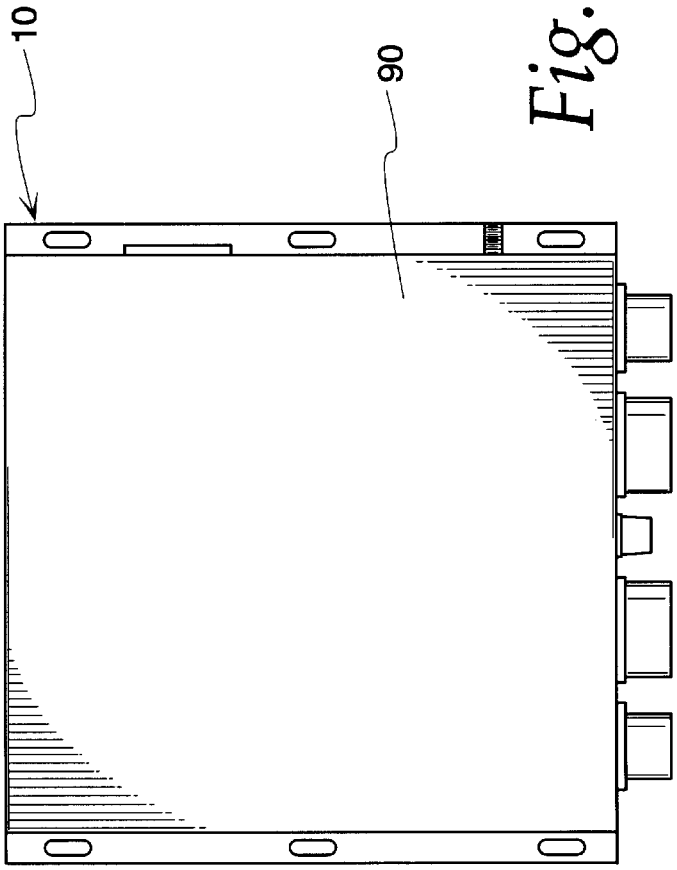
FIG. 3a is a top plan view of a monitoring and recording device according to principles of the invention.
Figure 3C:
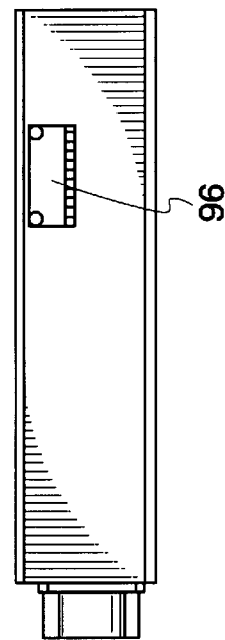
FIG. 3c is a side view thereof.
Figure 3B:
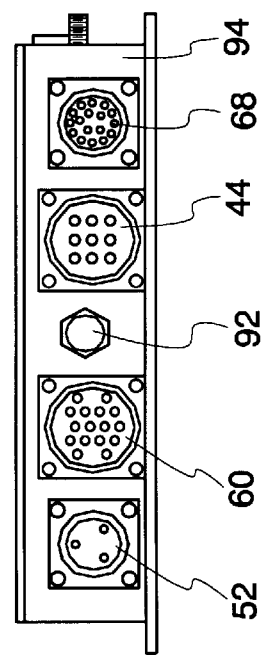
FIG. 3b is a front view thereof.
Figure 3D:
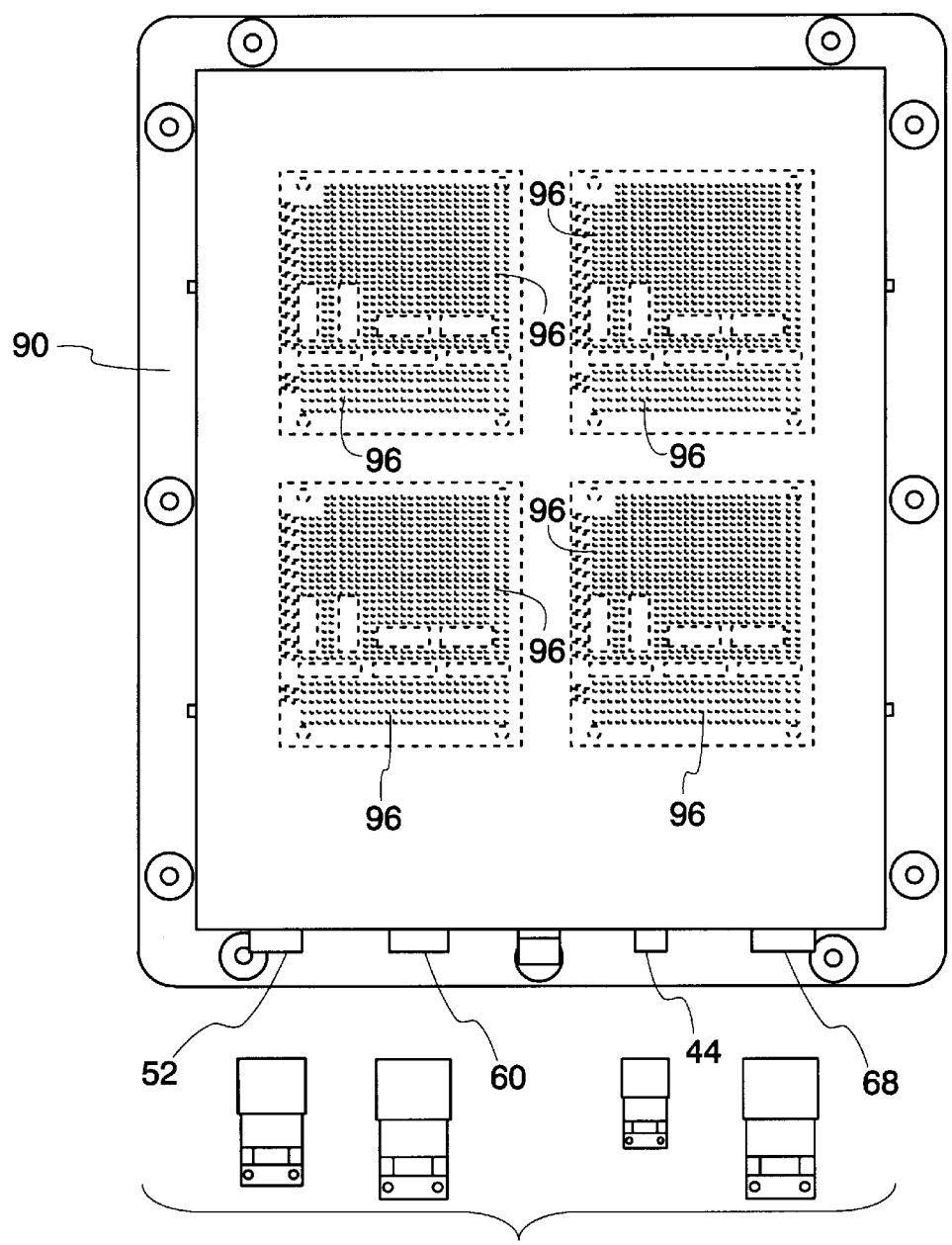
FIG. 3d is a top plan view similar to that of FIG. 3a but showing the cover removed.
Figure 3E:
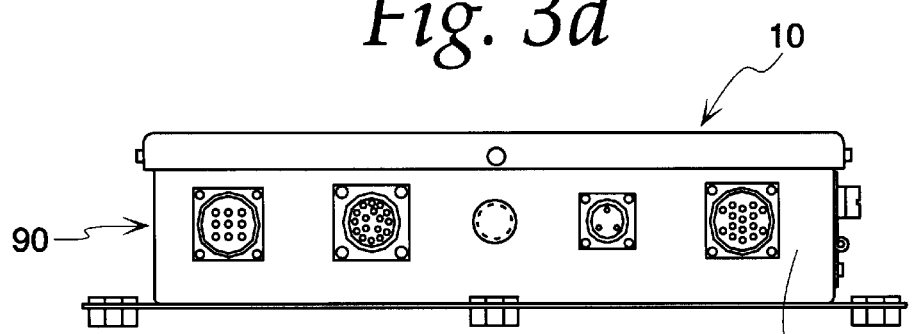
FIG. 3e is a front view similar to that of FIG. 3b but showing the cover removed.
Figure 4D:
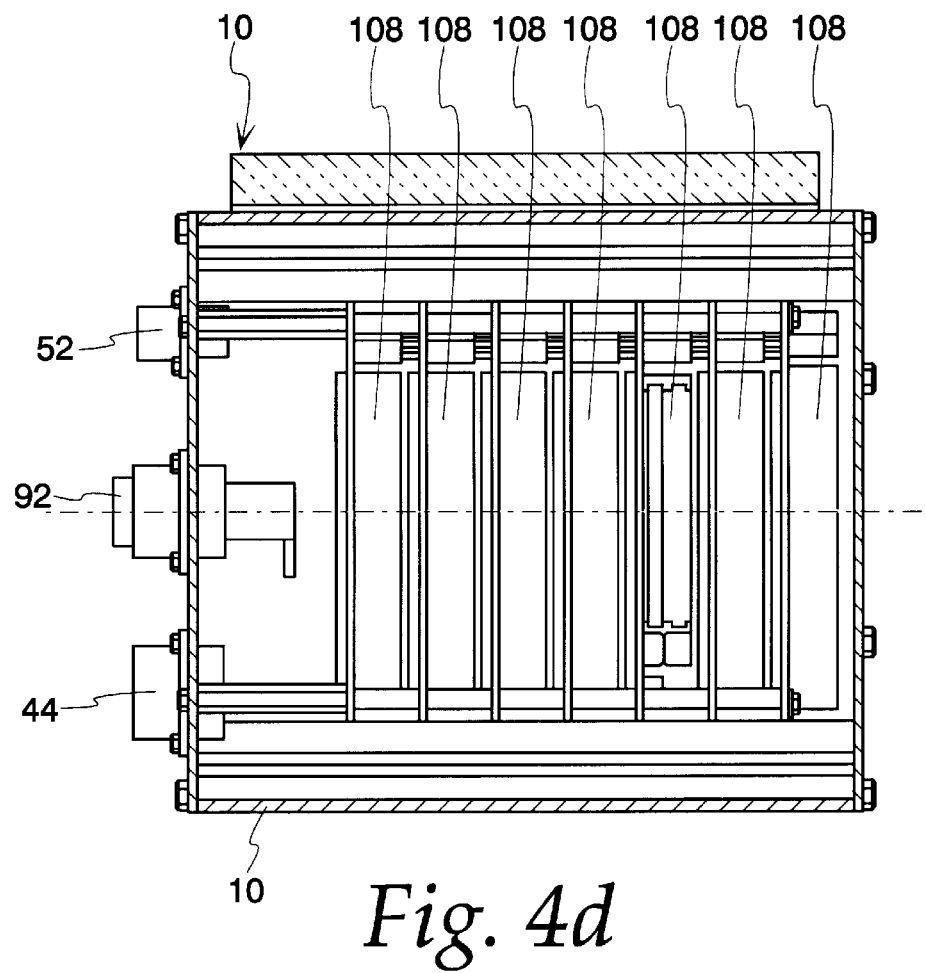
FIG. 4d is a side view similar to that of FIG. 4c but with the cover removed.
Figure 3F:
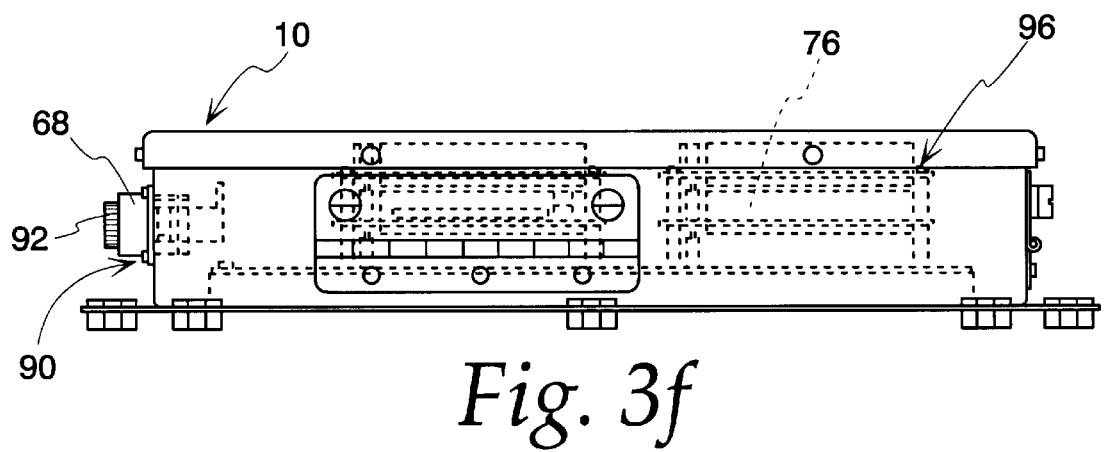
FIG. 3f is a side view similar to that of FIG. 3c but showing the cover removed.
Figure 4A:
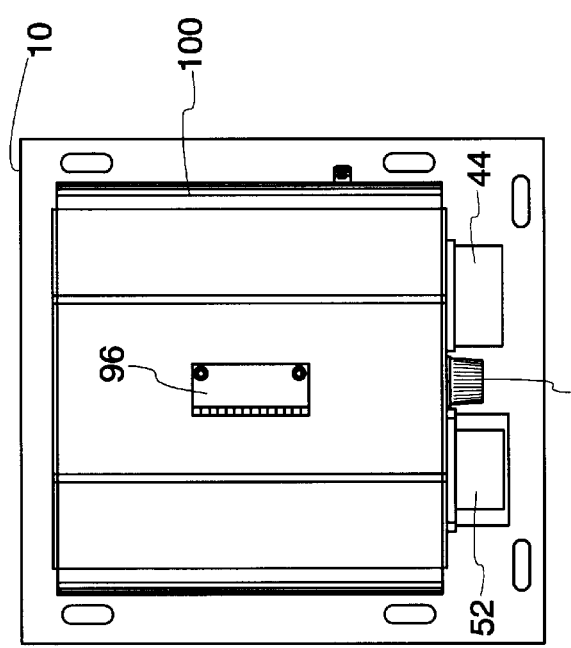
FIG. 4a is a top plan view of another embodiment of a monitoring and recording device according to principles os the present invention.
Figure 4B:
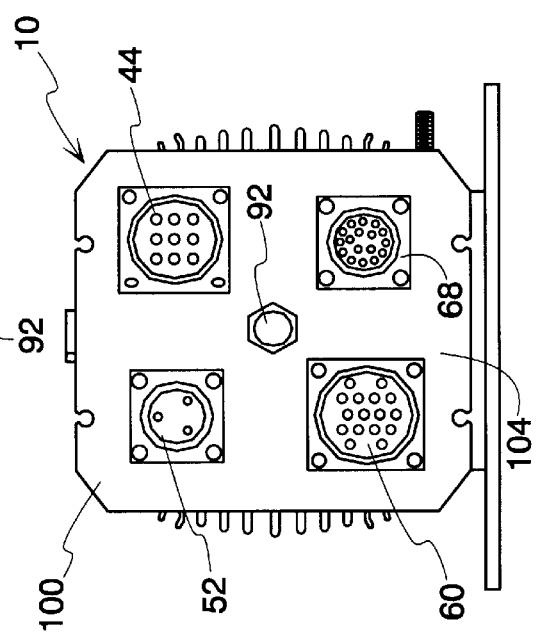
FIG. 4b is a front view thereof.
Figure 4C:
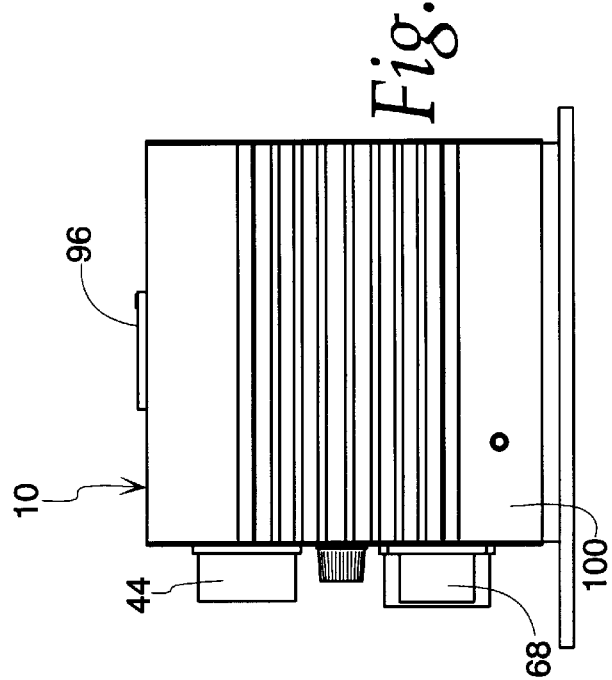
FIG. 4c is a side view thereof.

As mentioned above with respect to FIG. 1, the power supply or power regulation module 50 is energized by a vehicular source of power. In FIG. 2, it can be seen that power regulation module 56 is coupled through connector 52 to vehicle 86 which provides a battery (preferably 12 volt source), ground, and "ignition source" for the power regulation module 56. In the preferred embodiment, the "ignition source" preferably transmits a signal event from the vehicle to device 10, instructing the device to power up in preparation for initiation of data monitoring, recording and management operations. The "ignition source" could, for example, comprise the "ignition switch" connection commonly found on conventional vehicles, indicating that the ignition switch has been operated to start and run the vehicle. However, other ignition sources are contemplated by the present invention and these could include virtually any signal event associated with a motor vehicle. Examples include activation of an electronic brake module, activation of a power transmission, or deactivation of a vehicle high energy ignition circuits. Other vehicle electrical power circuits could be used, as well.

Additional flexibility of the monitoring and recording device according to principles of the present invention can be observed with respect to the low profile package of FIG. 3 and the high profile package of FIG. 4. Referring now to FIGS. 3*a*–3*f*, a first, "low profile" package for device 10 is shown. FIG. 3*a* shows a top plan view of a housing 90 for device 10 having a low profile configuration as can be seen in FIGS. 3*b* and 3*c*. A conventional fuse 92 is readily accessible on outside wall 94 of housing 90. Connectors 44, 52, 60 and 68 are also shown in FIG. 3*b*. Referring to FIG. 3*c*, a port 96 is shown for access to removable media associated with PCMCIA module 76. Referring to FIG. 3*d*, the cover of housing 90 has been removed to show that housing 90 provides accommodation for eight printed circuit boards or PC/104 cards 96.

In certain applications, a "high profile" package 100 may be desirable for its smaller footprint (see FIG. 4). Housing 100 contains the same circuitry as that described above, but arranges the components in a small footprint, high profile manner. As indicated in FIG. 4*d*, the cover of housing 100 is removed to show a sequential stacking of device modules embodied in separate PC/104 cards generally designated at 108.

With a relatively simple lengthening of the housing involved, additional space can be provided for added PC/104 cards. Thus, additional capability can be provided for added external, extra-network components, Ethernet or other communications capabilities.

Figure 5:
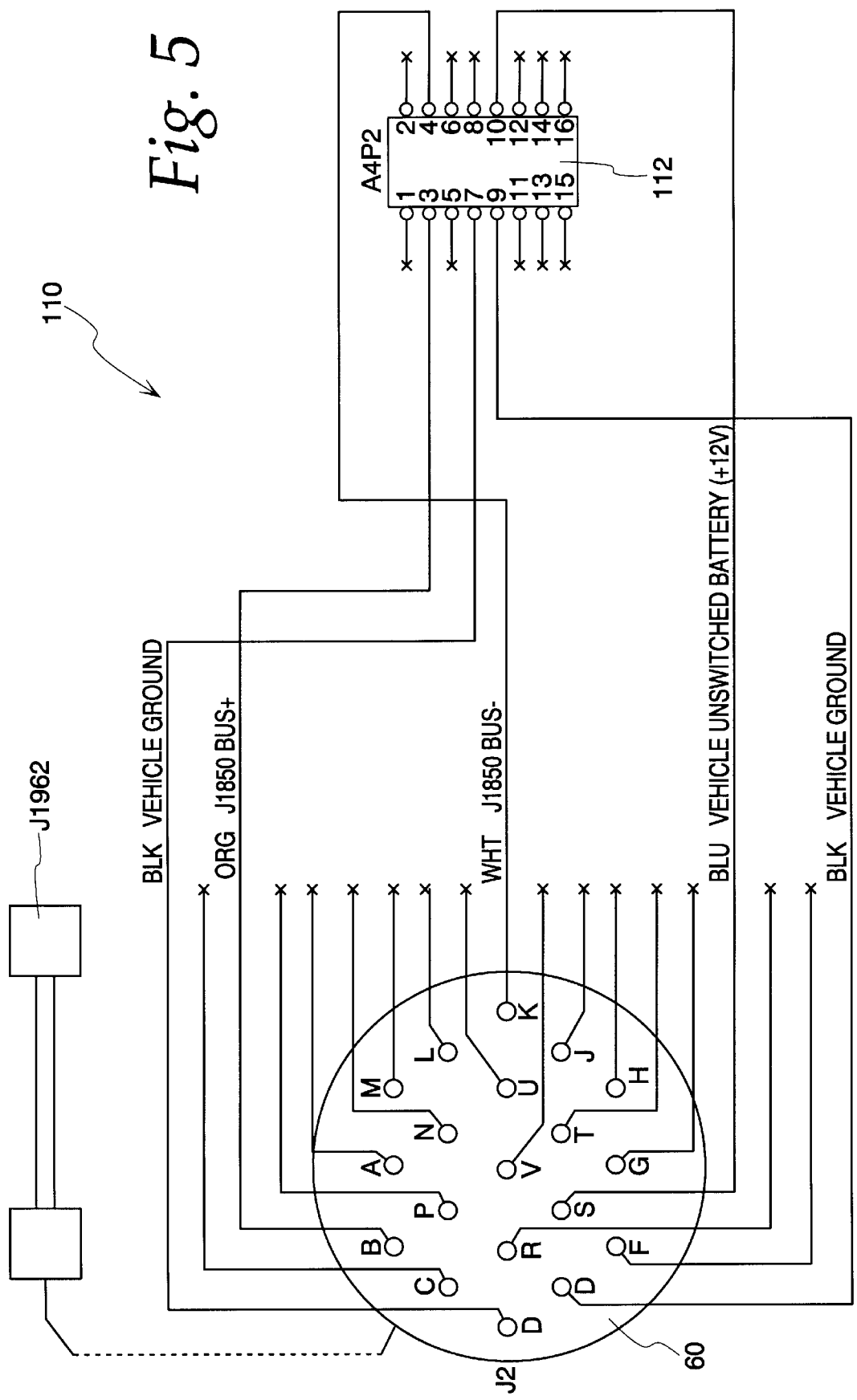
FIG. 5 is a schematic view of an OBD II interface cable.

Referring to FIG. 5, an OBD-II interface cable is generally indicated 110. This cable is preferably located internal to the housing 90. This interface cable includes the aforementioned interconnector 60 which mates with a diagnostic service connector on the vehicle. A connector 112 is also provided which mates to a connector on automotive interface module 64.

Figure 6:
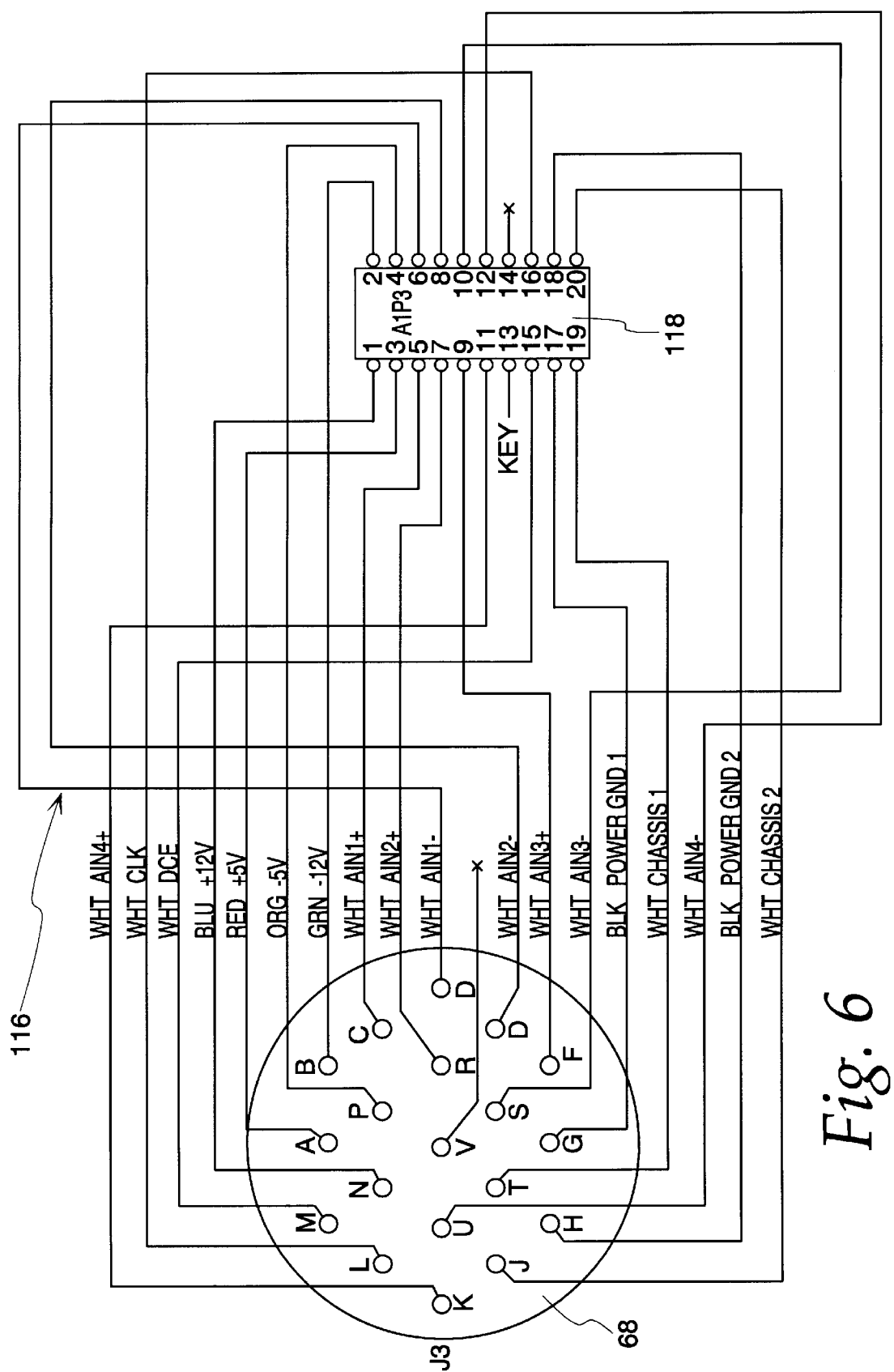
FIG. 6 is a schematic diagram of an analog interface cable.

FIG. 6 shows analog interface cable 116 which includes connector 68 for coupling to a remote connector mounted in the automotive vehicle. Cable 116 includes a second connector 118 to provide coupling to analog interface module 70. This cable is preferably located internal to the housing 90.

Figure 7:
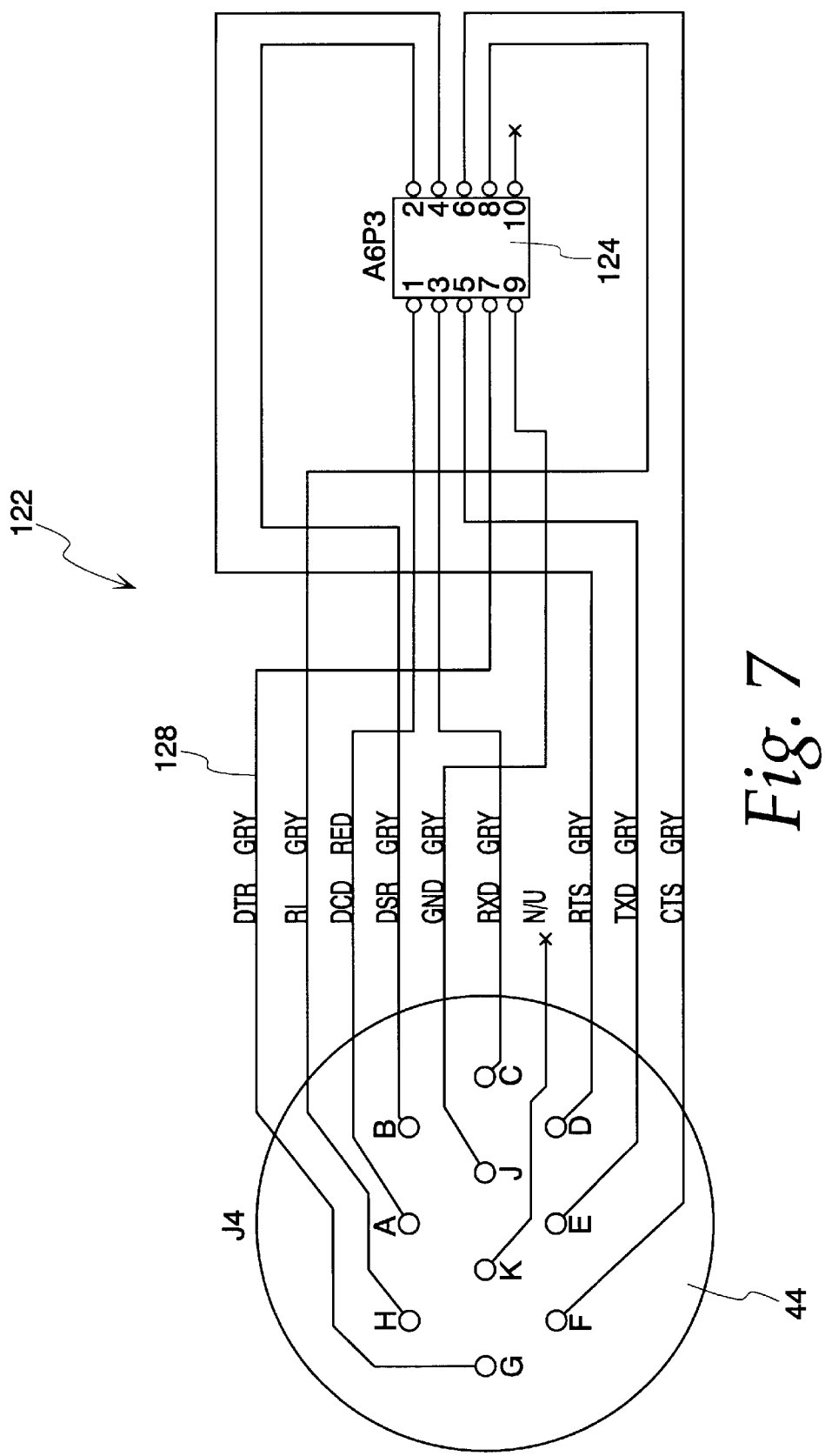
FIG. 7 is a schematic diagram of a serial connection interface cable.

FIG. 7 shows interconnection cable 122 having the connector 44 at one end and a connector 124 at the other end for coupling to control module 36. Included in cable 122 is a data transfer line 128 for downloading a configuration program through connector 124 to control module 36. The configuration program is created by a user interface on an external computer device and provides instructions for device 10 as to the manner by which device 10 monitors, records and otherwise manages data of interest. Three data collection modes are provided. In an automatic mode, the device 10 samples as soon as the instrument is powered up. In a Data Collect Enable mode, a logic level on an input pin enables or disables the sampling function. In the manual or Direct Control mode, manual control of sampling is made available from the user interface.

Figure 8B:
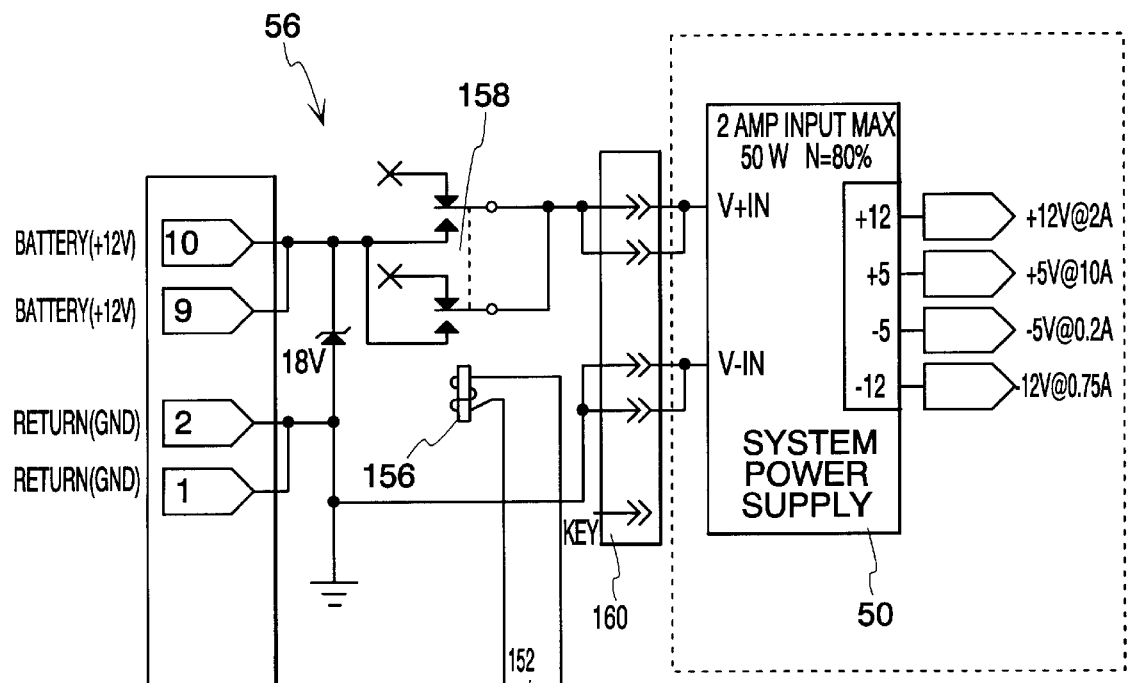
FIGS. 8a–8d show schematic diagrams of a power switching circuit according to principles of the present invention.
Figure 8A:
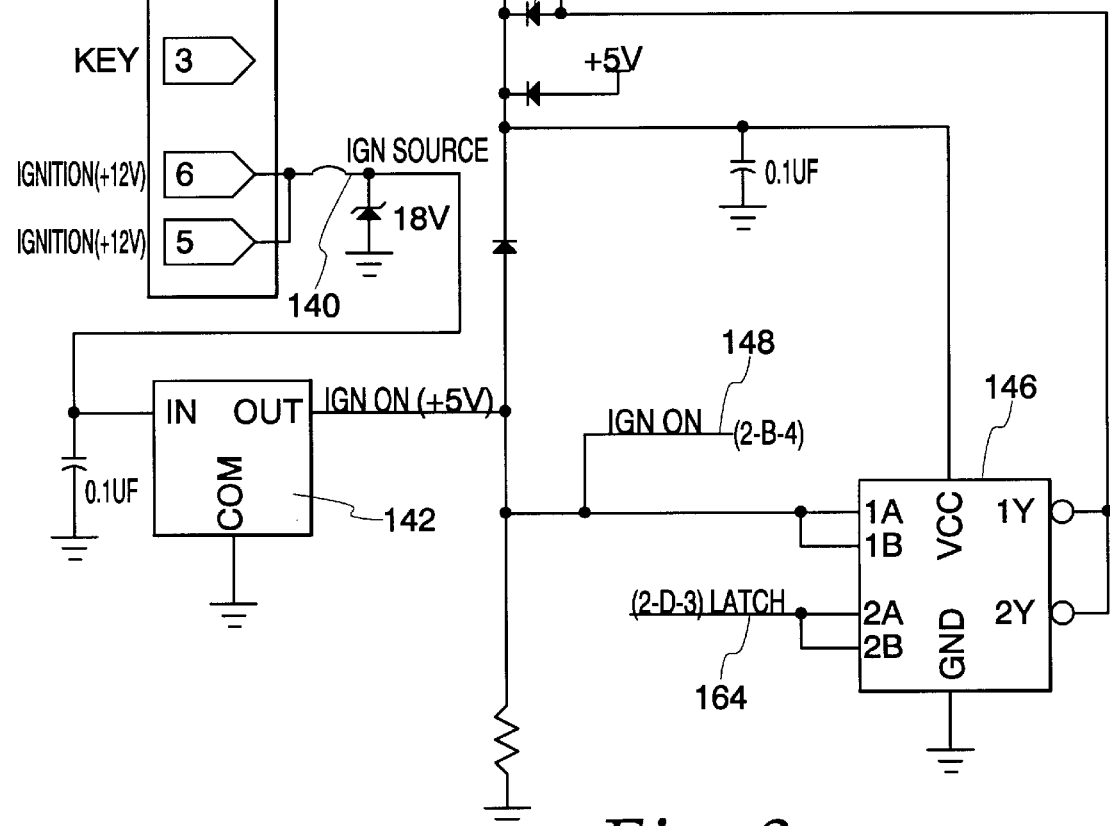

Referring now to FIG. 8*a,* power monitor module 56 will be described in further detail. Connector 52, mentioned above, is shown in the upper left corner of FIG. 8*a.* As indicated, connector 52 couples the battery, ground and ignition source as inputs to the circuitry. As mentioned, the ignition source can represent operation of the automotive ignition switch as well as other Signals associated with the motor vehicle. The ignition source signal is connected by line 140 to a conventional voltage regulator circuit 142. A conventional relay driver chip of device type SN 75464 is designated by the reference numeral 146. Relay driver chip 146 receives less voltage from voltage regulator circuit 142. A permissive input signal "IGN ON" is received on line 148, allowing the relay driver chip to sink current through pin 3 of chip 146 and relay 156 SO as to close the relay contact set 158 thereby applying power to connector 160.

Connector 160 delivers power to power supply module 50. This powers up device 10. After a boot sequence is performed in control module 36, the control module commands the "LATCH" bit high (see line 164 of FIGS. 8a–8d) through the complex programmable logic device 172 (see FIG. 9). The control module 36 contains a routine which directs device 172 to periodically poll terminal 148 to verify that the ignition source is still active. If the signal on line 148 goes low (indicating the absence of an ignition source), control module 36 begins a shut-down sequence, which includes writing data to storage and setting the "LATCH" bit 164 low, to turn off device 10. Delay can be added to the shut-down operation by carrying out software routines in control module 36. Preferably, the amount of delay is chosen to allow sampling of any data that may be required, for a fixed amount of time after loss of the afore-mentioned "IGN ON" signal.

Figure 9:
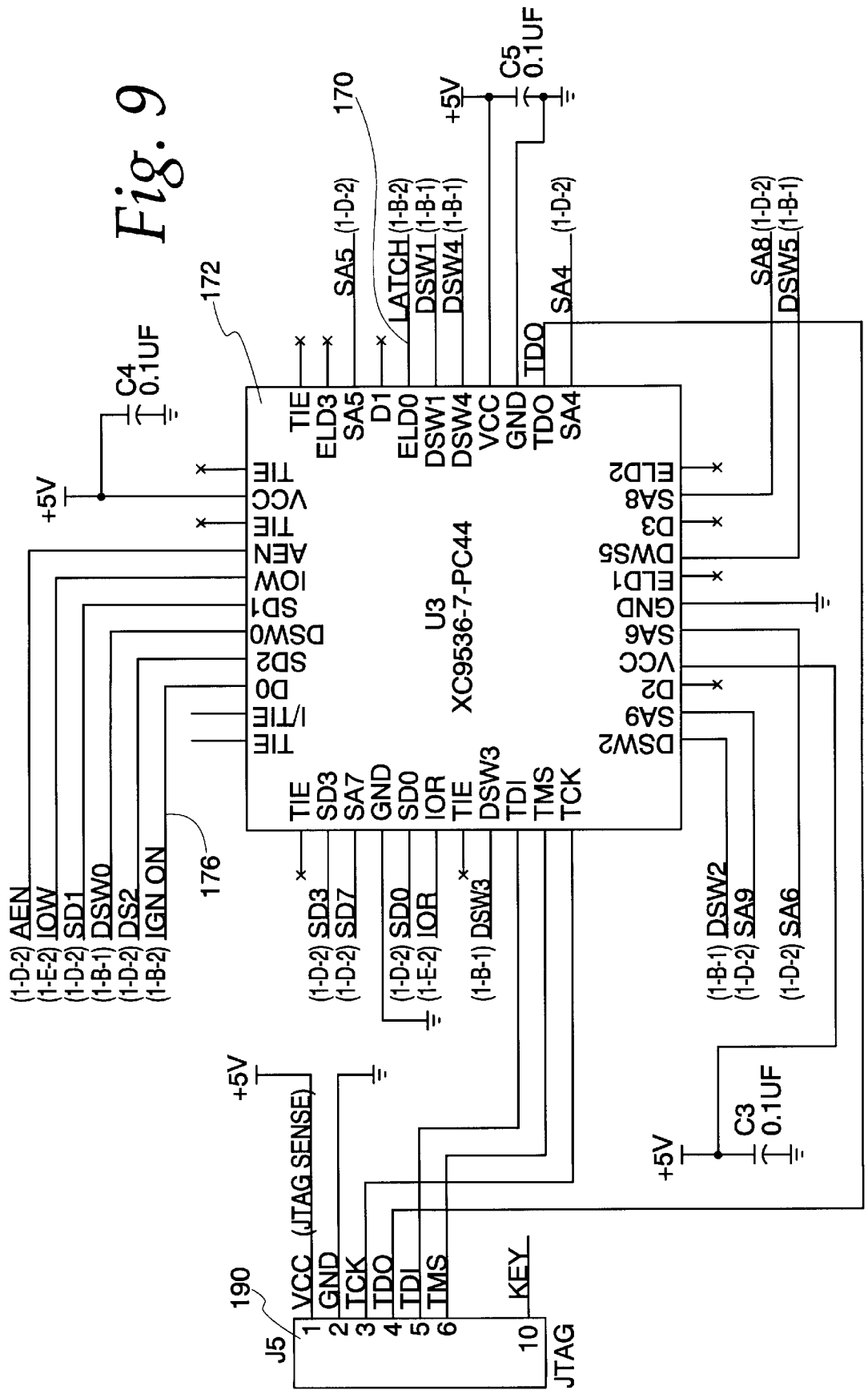
FIG. 9 is a fragmentary view of a portion of the power switching circuit.

Referring to FIG. 9, device 172 of the power monitor module 56 is a conventional complex programmable logic device, commercially available as device type XC9536. Device 172 is programmed, preferably one time, through JTAG connector 190.

With reference to FIG. 8b, connector 160 is coupled to system power supply module 50 which operates power on and power off device 10.

Figures 8C, 8D:
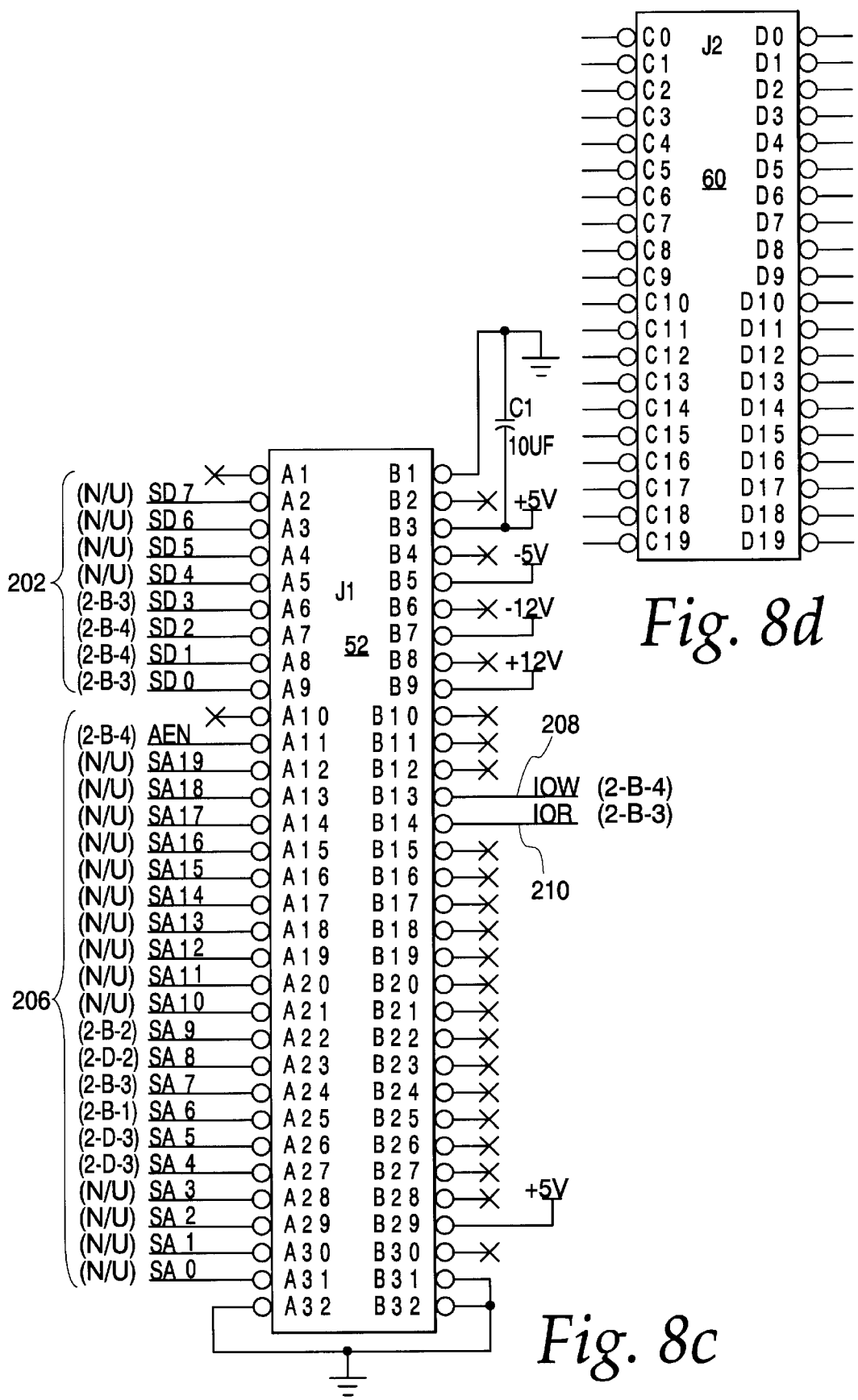

With reference to FIG. 8c, connector 52 accommodates the eight bit ISA bus 202 referred to above. Control module 36 includes embedded software timer routines to delay power down to device 10. Connector 52 includes address lines generally indicated by reference numeral 206, and read and write instructions are sent out on lines 210, 208, respectively.

Figure 10A:
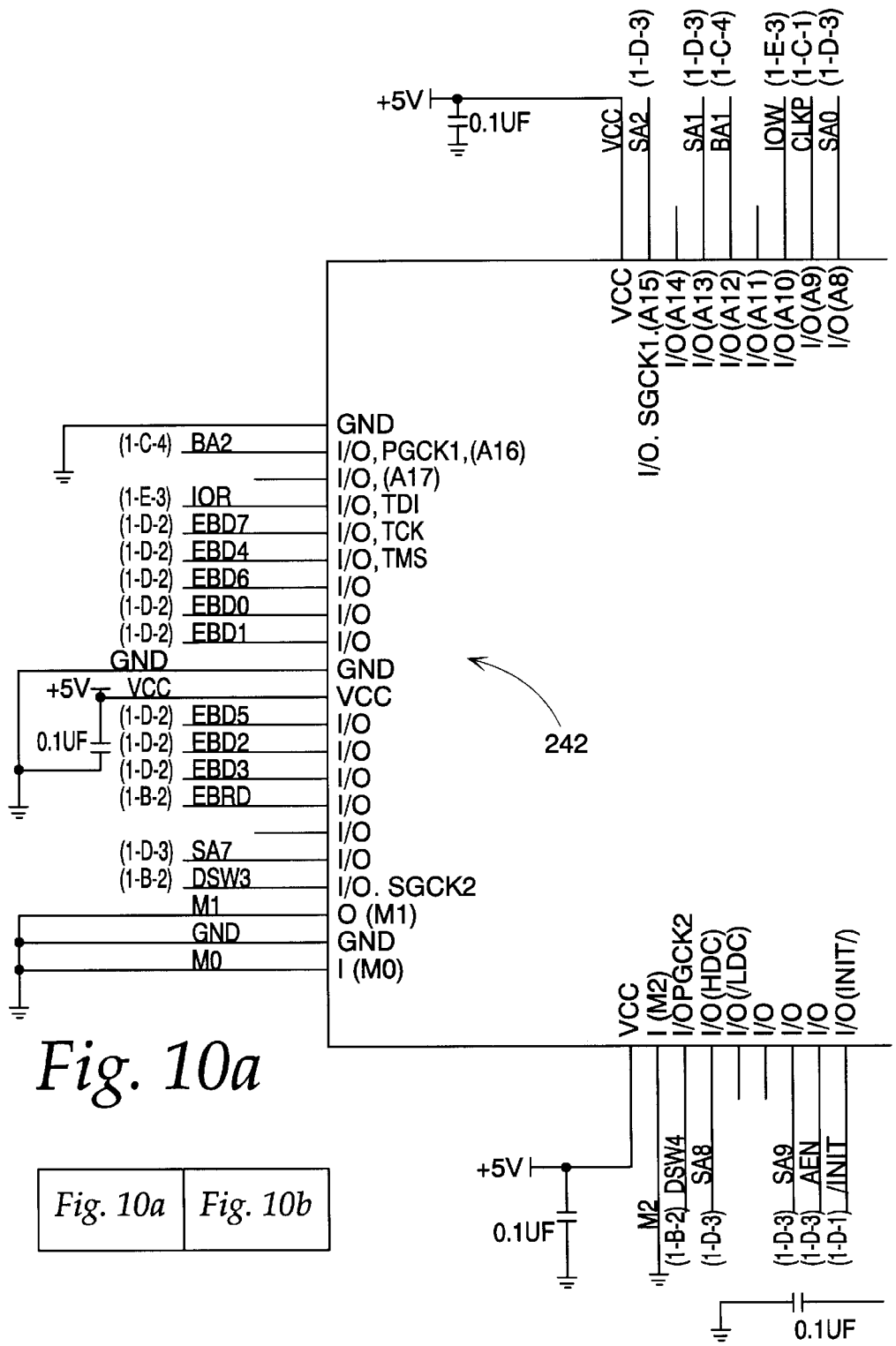
FIGS. 10a–10b are fragmentary schematic diagrams of an analog data circuit according to principles of the present invention.
Figure 10B:
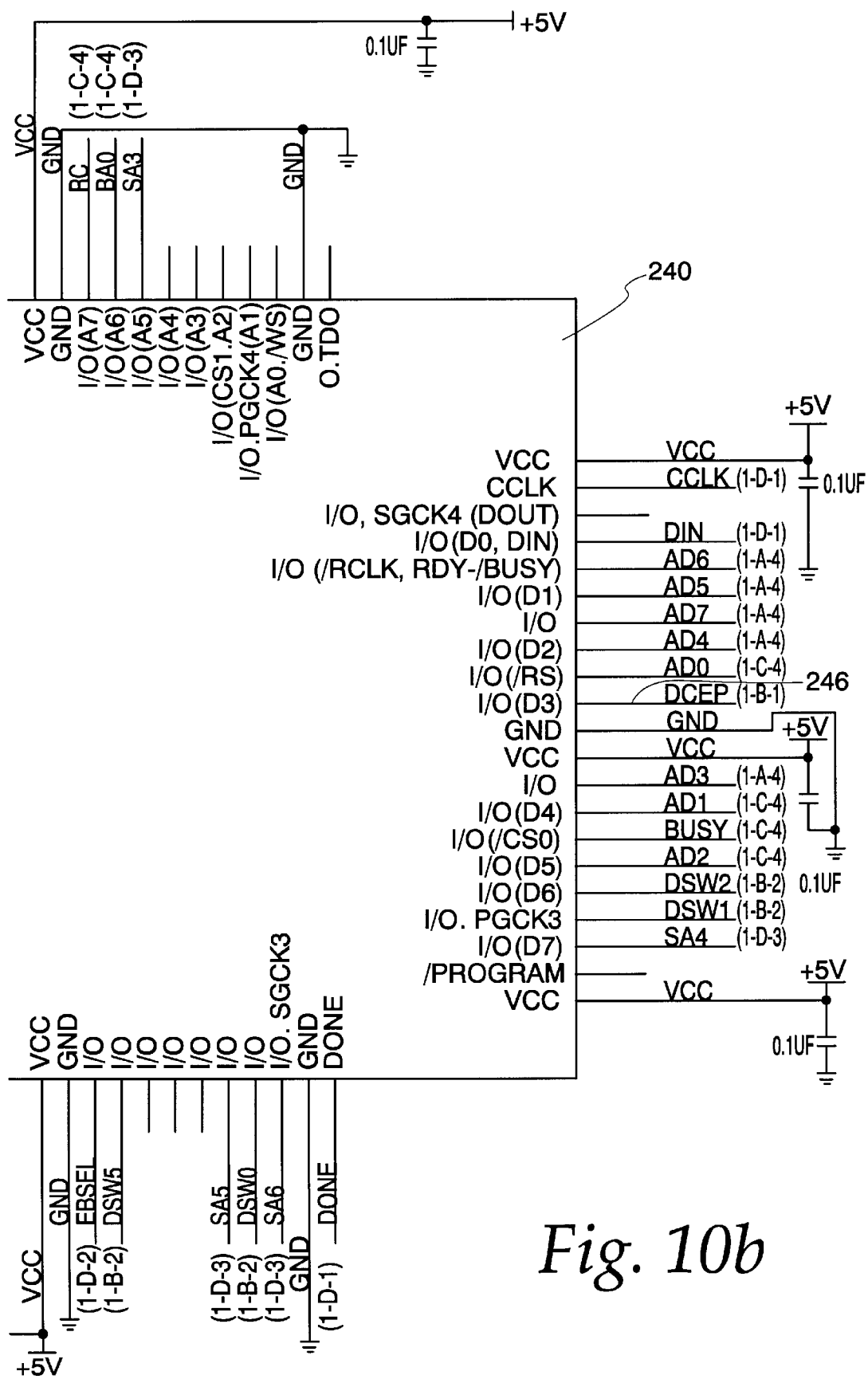
Figure 11:
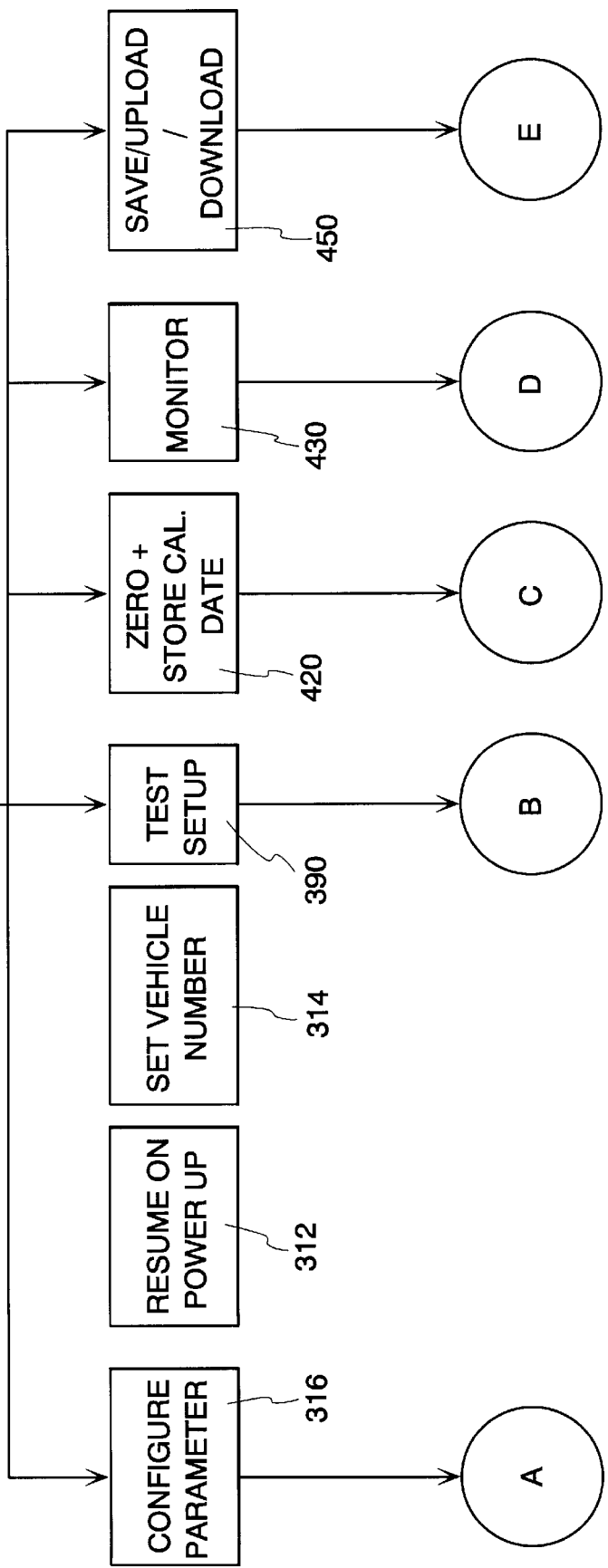

Referring now to FIGS. 10a–10b, integrated circuit device 240 comprises a field programmable gate array and preferably comprises conventional device type XC4005. Device 240 is employed in analog interface module 70 and includes data lines indicated by reference numeral 242 which are coupled through an analog to digital converter, instrumentation amplifier and filter (not shown) to a connector located on board the automotive vehicle. The field programmable gate array is programmed by serial PROM, preferably at boot-up and operates to acquire data from external, extra-network devices on board the automotive vehicle. As mentioned above, it is sometimes desirable to correlate onboard automotive data, both network and extranetwork, to the position of the vehicle along its trip path. In order to accomplish this, various arrangements may provide data indicative of the distance the automotive vehicle has traveled since start-up. For example, a plurality of magnets can be positioned on a vehicle wheel and a sensor can be used to count magnetic pulses when the wheel rotates. These pulses can be scaled to a linear distance that the automotive vehicle has traveled and, with onboard timing capability, vehicle velocity acceleration and rate of acceleration data can be obtained. These magnetic signals or their equivalent are acquired under control of device 240 in response to software instructions from control module 56.

It is generally preferred that operation of device 10 be carried out under previously constructed program instructions, prepared according to a preferred methodology carried out by a user interface operating on an external computer. The methodology of the user interface is shown in FIGS. 11–17. Preferably, the methodology is implemented as independently constructed software, in the form of a configuration (".config") file which is downloaded to control module 36. Most preferably, the downloaded configuration file is executed by the CPU in control module 36 under a multitasking RTOS, such as QNX.

The user interface method according to the present invention creates a data configuration structure (e.g., a table or other data structure) which the user can download in the form of a configuration file to device 10 thorough the serial connection port 44 (see FIG. 1) or through an Ethernet link. Device 10 uses an initialization file during boot-up to define certain actions required for device operation, such as the time delay value for auto shut-down referred to above. At power-up, device 10 will boot via the core module software embedded in read only memory 40. This core module will reference the configuration file previously downloaded into device 10. The monitoring and recording device 10 will then determine, according to the downloaded software, the number and type of data storage files required and will create these files. In addition, the required memory for histograms and other fixed storage data files will be allocated according to the downloaded software embedded within control module 36. A header will be stored in each data file containing necessary information associated with each data file.

The device 10 will then read the parameter list from the initialization file and create a parameter matrix. This matrix data will define the parameters to be sampled, the rate of sampling of the parameters and how the parameter data is to be stored within device 10. The matrix data will then be used to separate the types of data into three separate groups to allow for processing of the network parameters through the automotive interface module 64. The types of data include network data, analog or extra-network data and pulse parameters referred to above used to establish vehicle position and distance data.

As mentioned above, analog interface module 70 is provided for sensors and the like located outside of the automotive network. While these devices could release digital data and could be readily accommodated, it is assumed that the external devices will produce analog data. As will be appreciated by those skilled in the art, a wide variety of different signals will be encountered. The data may be represented, for example, by different types of changing voltages or currents by frequency data, as well as by digital data in various forms. The identification of various analog information to be collected, including calibration offsets and gain data, will be extracted from the matrix and used to calibrate the analog channels in module 70. The system will then extract the triggering and mode information from the configuration file. While the triggering information could include, for example, the ignition source signal referred to above, it is generally preferred that sample data is recorded only when a significant change in the data is detected, according to a predetermined user defined "triggering" mode. The device 10, after determining the configured mode of operation, will be set to sample and store data from the various input ports associated with analog interface module 70. In practical embodiments of the present invention, the afore-mentioned entire cycle requires less than two seconds to be carried out and is preferably made to repeat itself every time the device 10 is powered up. During operation, device 10 continually samples the serial communication port 44 for activity and sends out a status word to the port so as to allow the user interface to provide device status, even when the device is in a stand alone mode. A reload feature of the user interface allows a device initialization file to be updated without having to cycle power on the device.

As mentioned, device 10 uses a configuration file (generated by the user through the user interface methodology) implemented in software format. Through the configuration file the device performs the desired data sampling and determines when and how data is to be stored (using trigger level methodology as described above). Data can be sampled from the automotive network, analog channels and/or the pulse counter (for distance information). The sample rate for each sample parameter is defined, along with the desired storage technique. Each parameter can be stored in various conventional formats, including Compressed Time History (CTH) format, Histogram format, or, alternatively, as raw data. The bin and range information for the Compressed Time History and Histogram methodology are defined in the user interface along with the location where the file is to be stored. One or more data storage drives are provided onboard the monitoring and recording device.

As mentioned, the user interface software resides in an external microcomputer and performs set-up monitoring and data read-out functions. The software can run under conventional operating systems and all monitoring and recording device configurations are adjustable from the user interface.

As will be discussed herein, the parameters needed to set up the network interface include Parameter Id's (PIDs) Dynamic PIDs (DPIDs), sample rates, data byte/bit fields, filter types and message filter tasks. An initialization file is written to define the device configuration. The user makes a distinct selection to load the initialization file into device 10 via the serial port. Optionally, the use may add special network parameters into the parameter data base developed and maintained in the user interface and transferred to device 10.

The user interface methodology develops a table which lists all of the automotive network and extra-network ("analog") parameters, as well as pulse parameters acquired by device 10. The table also indicates whether the data will be stored as a Compressed Time History file, a Histogram file or a raw data file and will also provide an associated file name and storage location.

Referring now to FIGS. 11–17, a schematic diagram of the user interface methodology 300 is shown. These figures can also be understood to describe a software program implementing that methodology. Three different file types are expected by methodology 300. These file types include the afore-mentioned configuration file and data storage file and in addition also include a calibration file. Method control is initiated at block 310 which provides a number of preliminary functions. Included is a monitoring and recording device status feature which reports the present operating status of device 10 to the user interface (e.g., sampling, storing, or stand-by operation). Step 310 includes a RELOAD feature whereby a new configuration file (prepared according to the user interface) is extracted and downloaded to device 10. A choice of three sample modes is provided and is set by step 310. Included is a DCE or logic input sample mode an automatic or power-up mode, and a manual sample mode which makes it possible to over-write the other sample modes on command, (and such is contemplated for use when monitoring of device 10 only is desired).

The user is then prompted to continue with one of seven options. The first option, indicated by block 312, is to initiate auto sample operation. In block 314 an identify in number for the vehicle is set.

Figure 12:
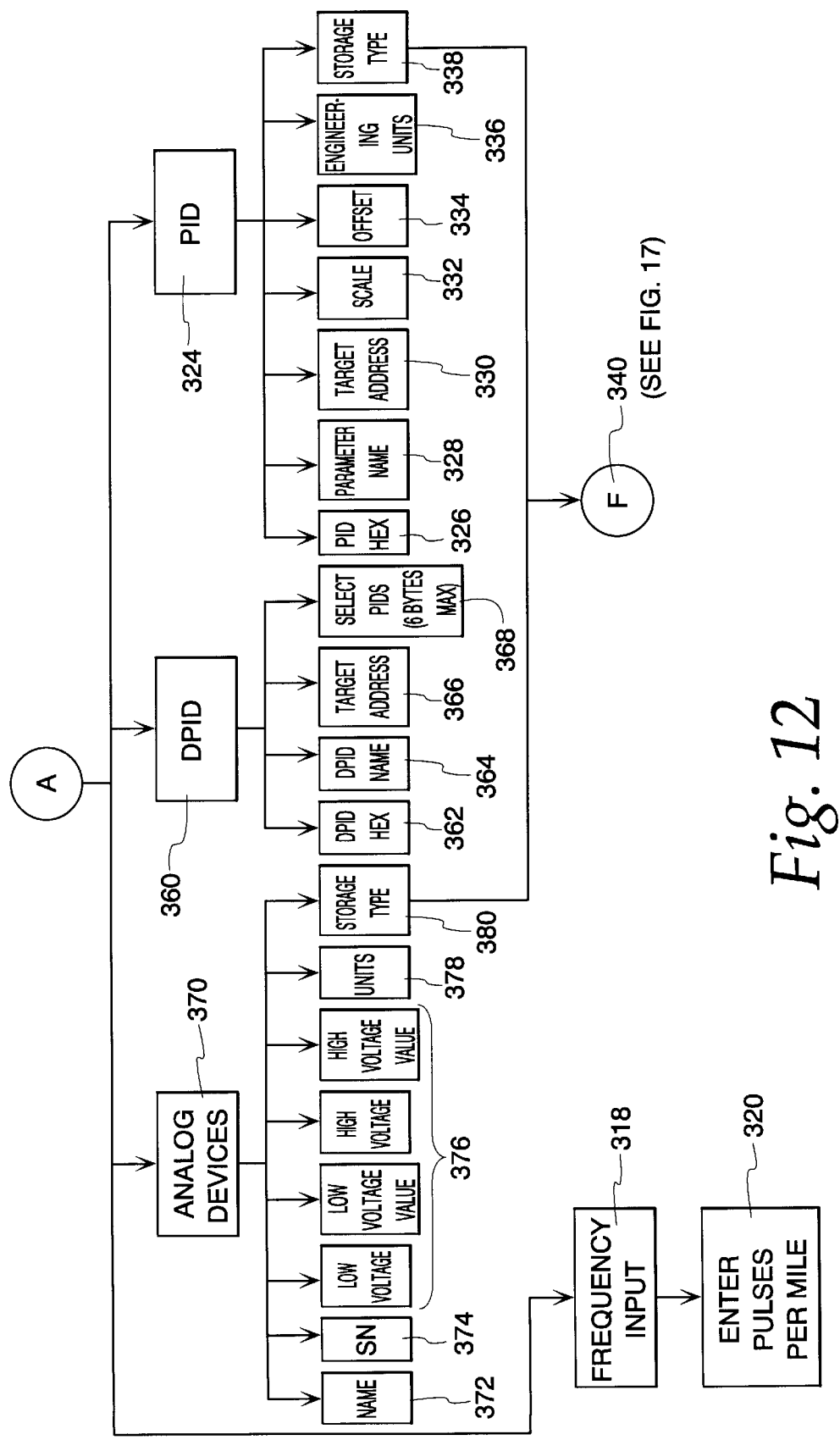

The user is prompted to configure the parameters desired, in block 316, and control is thereafter passed as indicated to FIG. 12. Four method paths are indicated in FIG. 12. In a first method path, control is transferred to block 318 where the frequency of the sample rate for distance and position is set. In block 320 the conversion between sensed pulses and mileage is set.

In a second method path shown at the right hand side of FIG. 12, Parameter Ids (PIDs) are inputted. Control is initiated with block 324 to select PIDs parameters. In block 326 and block 328 the numeric and ascii name for the PID parameter is entered. In block 330 the target address on the vehicle network is entered, and this address travels the vehicle network until the appropriate designation is located. In block 332 and block 334 scale and offset values are entered. In block 336 the engineering units for the PID is designated at an early stage in the user interface method. The expression of data, throughout, is presented to the user in terms of their selected engineering units and further conversion by the user, especially upon data extraction from device 10, is not required. In block 338 the type of storage is entered for the PID being defined, Preferably, in block 338 in addition to the storage designation for the data, the "significant change" or "trigger level" for the data is entered. As mentioned, in order to conserve processing energy, it is preferred that data entries are made only when a "significant" change in the data is observed. The quantification of this "significant" change is entered in block 380. Control is thereafter transferred to block 340 in FIG. 17.

Figure 17:
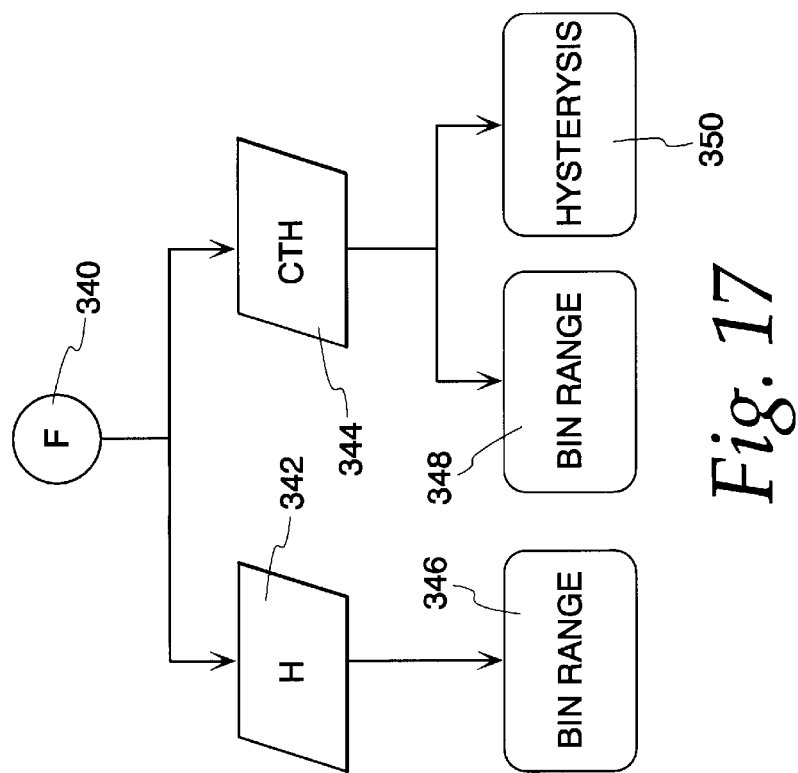
Figure 15:
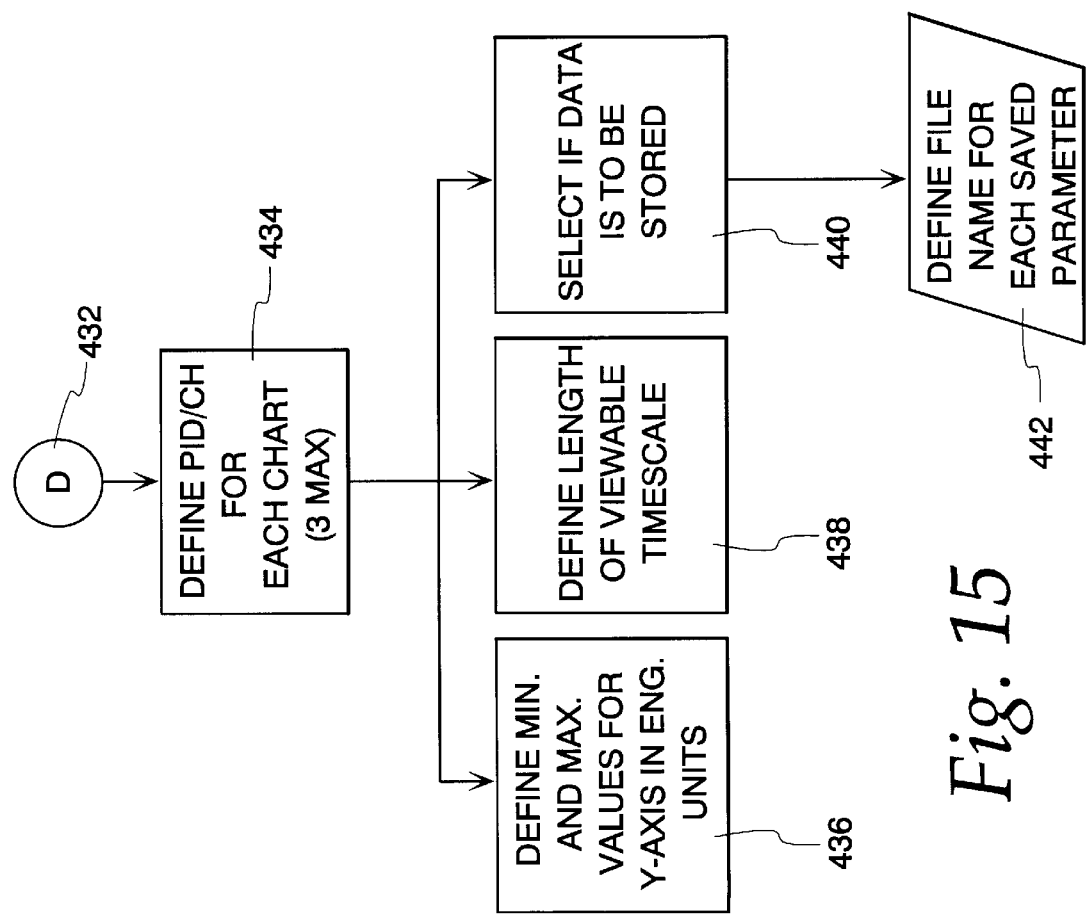
Figure 16:
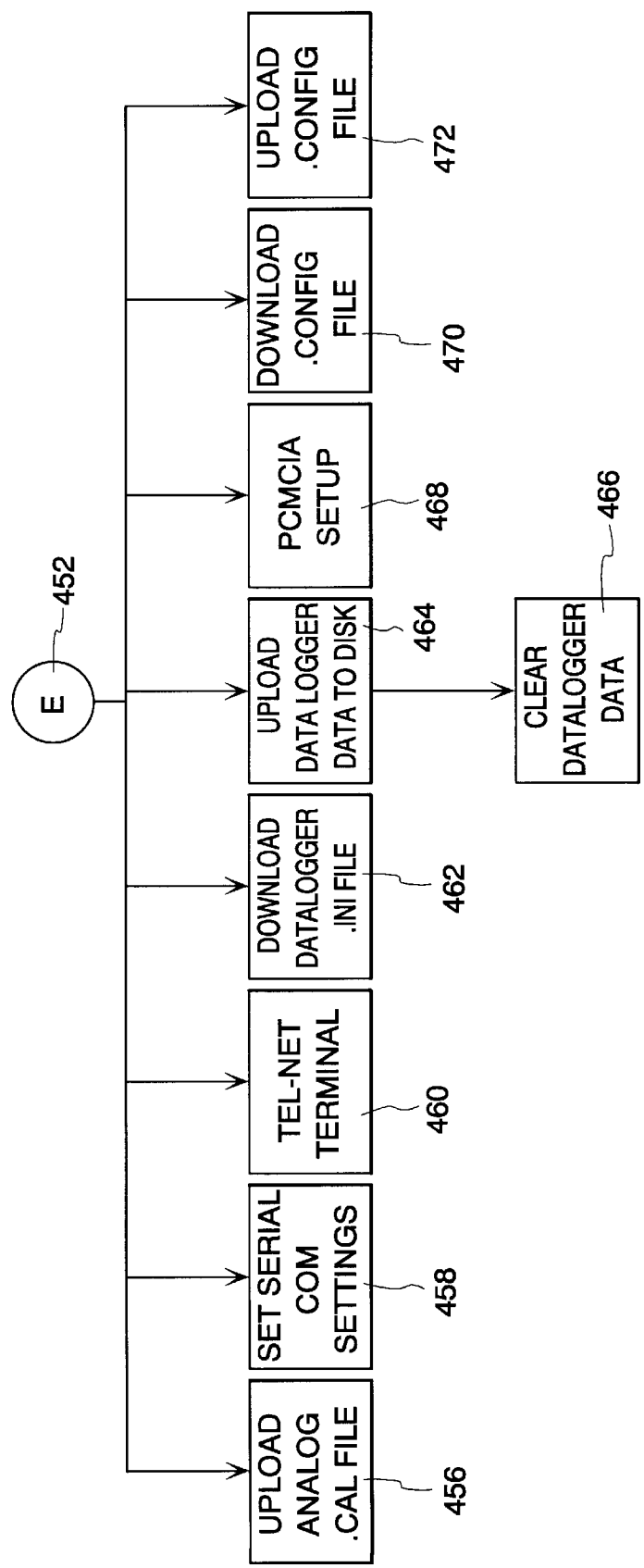

Referring now to FIG. 17, the user is prompted to select either or both of two modes, either a Histogram set-up mode in block 342 and a Compressed Time History set-up mode in block 344. In block 32 the user defines the bins to be employed according to a conventional Histogram methodology. In block 346 the user specifies the total number of bins, in terms of engineering units. As mentioned, the user is prompted as early as possible in the user interface methodology to express set-up parameters in terms of engineering units rather than some internal system of arbitrary units related to the electronic sensor or sonic software format. In block 344 the user has selected the PID to be processed according to Compressed Time History methodology. In block 348 their user specifies the bin range for which a data change is noted, with concurrent logging of distance traveled and event time. In block 350 a hysterysis value is set to remove bin crossover "jitter" according to conventional techniques. Internally, in a manner transparent to the user, the afore-mentioned data is preferably converted into a binary format which allows for speed of data processing. As mentioned, upon data extraction by the user, data expressed only in engineering units is reported to the user. Any necessary from a binary format to an engineering unit format being automatically carried out under software control, preferably embedded within device 10 but also possibly resident in the user interface program.

Referring now to FIG. 12, block 360 is chosen by the user to define dynamic parameter identification, or DPIDs. The term "diagnostic data packet" is sometimes used in place of the acronym DPID. Preferably, the DPID operates as a superset or collection of selected PIDs. In blocks 362 and 364 the numerical and ascii name of the DPID is entered by the user. In block 366 the automotive network address is entered and in block 68 the composition of the DPID is defined. Preferably, each DPID can identify a grouping of up to six PIDs. The use of DPIDs greatly improves network operation. For example, when parameters are continuously requested to be downloaded from the automotive network, the considerable overhead burden of parameter addresses would normally be present on the automotive network. The use of DPIDs is enabled by the automotive manufacturer so that when once (or relatively infrequently) delivered to the automotive network, the network will respond by sending out a "burst" of the selected PIDs without requiring further addressing.

In method path initiated by block 370 the user enters parameter information for analog or extra-network device data. In blocks 372, 374 the ascii and numeric name for the analog data is entered. In blocks 376 low voltage, low voltage values, high voltage and high voltage values are entered by the user. This data basically sets the slope of the vehicle device (e.g., transducer) being monitored. In block 378 the units for the data are entered by the user. After entering the type of storage for the collected data in block 380, control is transferred to block 340 in FIG. 17.

Preferably, in block 380 in addition to the storage designation for the data, the "significant change" or "trigger level" for the data is entered. As mentioned, in order to conserve processing energy, it is preferred that data entries are made only when a "significant" change in the data is observed. The quantification of this "significant" change is entered in block 380.

Referring again to FIG. 11, a test set-up method path is initiated in block 390. Control is transferred to block 392 in FIG. 13. In block 392 the user is prompted to set up the test routine desired. In block 394 the user selects testing of the automotive network data collection. In blocks 396 and 398 the DPIDs are identified and the sample rate is selected. The DPID data is then collected and made available to the user utilizing the external computer running the user interface methodology. In block 402 the user selects testing of extra-network or "analog" data. In block 404 the name of the analog data desired is entered in ascii and numerical format. In block 406 the analog channel of the analog interface module 70 is entered. In block 408 the sample rate determined by the user is entered and sent to device 10 to perform the desired sampling.

In the remaining method path, block 410 sets up a user defined continuous trace of information on the bus 30 of device 10. This continuous trace is outputted to an external computer as indicated by block 412. Referring again to FIG. 11, a zeroing and calibration procedure is initiated in block 420. The zero offset and calibration data are entered in block 420 and control is transferred to block 422 (see FIG. 14). The desired calibrated values are then output to the user under control of block 424, allowing the user to confirm the desirability of the offset and calibration values entered in block 420. In block 424 control is preferably carried out to zero out analog devices, optionally clearing all calibration channels and then allowing the user to proceed with calibration of one or more individual channels.

Referring again to FIG. 11, setting of the user's monitor is initiated in block 430. Control is then transferred to block 432 in FIG. 15. As contemplated in block 434, the user is allowed three chart-like output areas for monitoring purposes. The user interface provides the capability of three strip-charts to be used for real-time monitoring of up to three data parameters. The X and Y axes can be scaled accordingly, where the X axis represents time and the Y axis represents the value of the sampled parameter in the corresponding engineering units. The user is also given the option of saving the incoming data streams to disk, in a readily retrievable manner without requiring download of the entire contents of device 10. In block 434 up to three PIDs for extranetwork channels are selected. In block 436 the user is prompted to enter engineering units defining minimum and maximum values for the Y-axis display. In block 438 the time scale of the monitored area is defined by the user and in block 440 the user is able to specify whether or not the observed data is to be saved in a special, easily accessed storage area, where data is made available to the user without requiring the download of the entire memory contents of device 10. In block 442 a file name is determined for each parameter requested to be stored.

Referring again to FIG. 11, file uploading and downloading on device 10 and the user is initiated in block 450. Control is transferred to block 452 in FIG. 16. In block 456 the user can chose to upload an analog calibration file for the analog channel desired. In block 458 the user can set communication settings, controlling the operation of the serial communication output of control module 36 (see reference number 44 in FIG. 1) or an optional Ethernet link (not shown). In block 460 the user can set the operating parameters of an optional telephone network device. Such device would be installed as an extra optional card connected to bus 30. In block 462 the user can download an initialization file to device 10. The initialization file can include, for example, values for time delay and power down, as mentioned above. Other system operating parameters to be set only by the manufacturer or trained personnel can be stored in the initialization file, with access to the file being limited.

In block 464 the user can request device 10 to upload its contents to the user through the communication port associated with control module 36. In block 466 the user can cause data stored within device 10 to be cleared. In block 468 the user accesses the PCMCIA equipment of module 76. In block 470 the user is able to download a configuration file to device 10. The configuration file consists of data compiled in the remaining method branches shown in FIG. 11. These method branches cause a configuration file to be created which defines the data to be collected, the way in which the data is sampled, and the way in which data is reported to the user, both through a storage format and through a monitoring and test format. In block 472 the user can upload the configuration file stored in device 10.

As mentioned above, the user interface methodology is preferably carried out in software.

Thus, in view of the foregoing, it can be seen that all the functions needed for monitoring, recording and other management of collected data are provided onboard a single housing and allowing data hook-up to a reliable hardened vehicle data port provided and serviced by the vehicle manufacturer.

The drawings and the foregoing descriptions are not intended to represent the only forms of the invention in regard to the details of its construction and manner of operation. Changes in form and in the proportion of parts, as well as the substitution of equivalents, are contemplated as circumstances may suggest or render expedient; and although specific terms have been employed, they are intended in a generic and descriptive sense only and not for the purposes of limitation, the scope of the invention being delineated by the following claims.

What is claimed is:

1. A system for managing vehicle parameter data, for use with a vehicle having a plurality of sensor devices positioned on the vehicle for sensing operating parameters of said vehicle and for generating vehicle parameter data in response thereto, said vehicle further having an onboard vehicle data network for receiving vehicle parameter data from said plurality of sensor devices, the system comprising:

a device for mounting on-board said vehicle;

the device including a passive network connector for interconnecting a plurality of device network modules to the device to form a device network;

the device further including a plurality of device network modules connected to said passive network connector for data communication with one another;

said plurality of device network modules including a vehicle interface module with a connector for connection to said vehicle data network to receive vehicle parameter data therefrom;

said device network modules residing on separate circuit board substrates removably connected to said passive network connector and including a control module having a central processing unit with program memory storage for storing an operating program for said central processing unit;

said central processing unit and said vehicle interface module cooperating in accordance with said operating program to receive vehicle parameter data from said vehicle and to make said vehicle parameter data available to said device network.

2. The system of claim 1 wherein said plurality of device network modules further including a data storage module and said central processing unit and said data storage module cooperate in accordance with said operating program to store parameter data in said data storage module.

3. The system of claim 2 wherein said data storage module includes storage memory.

4. The system of claim 2 wherein said data storage module includes a magnetic storage disc.

5. The system of claim 1 wherein:

said vehicle further includes at least one external sensor device positioned on the vehicle for sensing operating parameters of said vehicle and for generating external vehicle parameter data in response thereto;

said plurality of device network modules includes an external vehicle parameter interface module with a connector for connection to said at least one external sensor device to receive external vehicle parameter data therefrom and to make said external vehicle parameter data available to said device network.

6. The system of claim 1 wherein said network electrical power source is coupled to a vehicle electrical power source to receive electrical power therefrom and said power monitor module operates to terminate power consumed from said vehicle electrical power source when said vehicle electrical power circuit is in an OFF condition.

7. The system of claim 1 wherein said circuit board substrates comprise PC/104 cards.

8. The system of claim 7 wherein said passive network connector includes stack through connectors for each card.

9. The system of claim 7 wherein said passive network connector includes ISA network connectors for each card.

10. The system of claim 1 wherein said operating program includes both hardware and software interrupt commands.

11. A system for managing vehicle parameter data, for use with a vehicle having a plurality of sensor devices positioned on the vehicle for sensing operating parameters of said vehicle and for generating vehicle parameter data in response thereto, said vehicle further having an onboard vehicle data network for receiving vehicle parameter data from said plurality of sensor devices, and a vehicle electrical power circuit operable between ON and OFF conditions to initiate and to cease operation of portions of said vehicle, respectively; the system comprising:

a device for mounting on-board said vehicle;

the device including a passive network connector for interconnecting a plurality of device network modules to the device to form a device network;

the device further including a plurality of device network modules, said plurality of device network modules receiving electrical power from a device network electrical power source, and said plurality of device network modules requiring electrical power from said network electrical power source to operate, with operation of said device network modules being terminated following interruption of power flow from said network electrical power source to said device network modules;

said plurality of device network modules connected to said passive network connector for data communication with one another;

said plurality of device network modules including a vehicle interface module with a connector for connection to said vehicle data network to receive vehicle parameter data therefrom, and a control module having a central processing unit with program memory storage for storing an operating program for said central processing unit;

said plurality of device network modules includes a power monitor module coupled to said vehicle electrical power circuit to sense the ON and OFF conditions thereof and to interrupt power flow from said network electrical power source to said device network modules in response to sensing an OFF condition of said vehicle electrical power circuit;

said power monitor module including a time delay system for delaying interruption of power flow from said network electrical power source to said device network modules for a preselected time delay after an OFF condition of said vehicle electrical power circuit is sensed, the time delay being set by accessing said power monitor module through said device network; and said central processing unit and said vehicle interface module cooperating in accordance with said operating program to receive vehicle parameter data from said vehicle and to make said vehicle parameter data available to said device network.

12. A system for managing vehicle parameter data, for use with a vehicle a having a vehicle electrical power circuit operable between ON and OFF conditions to initiate and to cease operation of portions of said vehicle, respectively, said vehicle further having at least one sensor device positioned on the vehicle for sensing an operating parameter of said vehicle and for generating vehicle parameter data in response thereto, said vehicle further having an onboard vehicle data network for receiving vehicle parameter data from said at least one sensor device, the system comprising:

a device for mounting on-board said vehicle;

the device including a network connector for interconnecting a plurality of device network modules to the device to form a device network;

the device further including a plurality of device network modules connected to said passive network connector for data communication with one another, said plurality of device network modules receiving electrical power from a device network electrical power source said plurality of device network modules including a sensor interface module with a connector for connection to said at least one sensor device to receive vehicle parameter data therefrom;

said plurality of device network modules includes a power monitor module coupled to said vehicle electrical power circuit to sense the ON and OFF conditions thereof and to interrupt power flow from said network electrical power source to said device network modules in response to sensing an OFF condition of said vehicle electrical power circuit;

said plurality of device network modules require electrical power from said network electrical power source to operate, with operation of said device network modules being terminated following interruption of power flow from said network electrical power source to said device network modules; and said power monitor module includes a time delay system for delaying interruption of power flow from said network electrical power source to said device network modules for a preselected time delay after an OFF condition of said vehicle electrical power circuit is sensed, the time delay being set by accessing said power monitor module through said device network.

13. The system of claim 12 wherein said network electrical power source is coupled to a vehicle electrical power source to receive electrical power therefrom and said power monitor module operates to terminate power consumed from said vehicle electrical power source when said vehicle electrical power circuit is in an OFF condition.

14. A system for managing vehicle parameter data, for use with a vehicle having at least one sensor device positioned on the vehicle for sensing an operating parameter of said vehicle and for generating vehicle parameter data in response thereto, the system comprising:

a first and a second device for mounting on-board said vehicle, each device including a network connector for interconnecting a plurality of device network modules to the device to form a device network, a plurality of device network modules connected to said network connector for data communication with one another, said plurality of device network modules including a control module having a central processing unit with a system clock and program memory storage for storing an operating program for said central processing unit;

at least one of said devices having a sensor interface module with a connector for connection to said at least one sensor device to receive vehicle parameter data therefrom, the system clock of at least one of said devices being synchronizable to an external clock, and a synchronization communication link between said system clocks for synchronizing the system clocks of one device to the system clock of the other device.

15. A method for generating a data configuration structure used to configure a system for monitoring and recording analog parameter data generated by a vehicle-mounted transducer having a voltage-engineering units slope and network parameter data generated on a vehicle network, comprising the steps of:

entering in the data configuration structure, for each analog parameter:

a name of the parameter;

voltage values defining the voltage-time slope of the transducer;

engineering units to be assigned to the analog parameter data;

storage bin values which must be exceeded before a change in parameter data is recognized;

entering in the data configuration structure, for each network parameter, a name of the parameter, the vehicle network address of the parameter, scale and offset values for the parameter engineering units to be assigned to the vehicle network parameter, and storage bin values which must be exceeded before a change in parameter data is recognized;

entering in the data configuration structure, for each analog parameter, a storage threshold data value which must be exceeded before a change in parameter data is recognized;

entering in the data configuration structure, for each analog parameter and for each network parameter entered, a data representation format for parameter data;

said data representation format including either a histogram format or a compressed time history format;

entering in the data configuration structure, for each histogram format specified, bin ranges expressed in the engineering units assigned for the parameter receiving the data representation format; and entering in the data configuration structure for each compressed time history format specified, bin ranges, expressed in the engineering units assigned for the parameter receiving the data representation format, and a hysteresis value, expressed in the engineering units assigned for the parameter receiving the data representation format.

16. The method of claim 15 further comprising the step of entering in the data configuration structure, for each analog parameter specified, the sample rate at which parameter data is to be sampled by the system for monitoring and recording parameter data.

17. The method of claim 15 further comprising the step of entering in the data configuration structure, for each network parameter specified, whether the network parameter is to be stored and monitored or is to be stored without monitoring.

18. The method of claim 15 further comprising the step of entering in the data configuration structure, for at least one group parameter, a name of the group parameter, and a name or a vehicle network address of a plurality of network parameters.

* * * * *

UNITED STATES PATENT AND TRADEMARK OFFICE
CERTIFICATE OF CORRECTION

PATENT NO. : 6,356,823 B1          Page 1 of 1
DATED : March 12, 2002
INVENTOR(S) : Iannotti et al.

It is certified that error appears in the above-identified patent and that said Letters Patent is hereby corrected as shown below:

<u>Title page,</u>
Item [73], Assignee, change "ITT" to -- IIT --.

Signed and Sealed this

Eleventh Day of June, 2002

Attest:

Attesting Officer

JAMES E. ROGAN
*Director of the United States Patent and Trademark Office*